United States Patent
Baek et al.

(10) Patent No.: US 9,071,991 B2
(45) Date of Patent: Jun. 30, 2015

(54) METHOD AND APPARATUS OF REQUIRING UPLINK RESOURCES FOR TRANSMITTING RANGING REQUEST MESSAGE IN COMMUNICATION SYSTEM

(75) Inventors: Young-Kyo Baek, Seoul (KR); Yeong-Moon Son, Yongin-si (KR); Jung-Je Son, Yongin-si (KR); Hyun-Jeong Kang, Seoul (KR); Kyung-Kyu Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 12/915,750

(22) Filed: Oct. 29, 2010

(65) Prior Publication Data

US 2011/0103329 A1   May 5, 2011

(30) Foreign Application Priority Data

Oct. 30, 2009   (KR) .................. 10-2009-0104170

(51) Int. Cl.
*H04W 4/00*   (2009.01)
*H04W 28/06*   (2009.01)

(52) U.S. Cl.
CPC .................... *H04W 28/065* (2013.01)

(58) Field of Classification Search
None
See application file for complete search history.

(56) References Cited

U.S. PATENT DOCUMENTS

| 2006/0203712 | A1  | 9/2006  | Lim et al. |
| 2008/0139216 | A1  | 6/2008  | Lee et al. |
| 2009/0213813 | A1* | 8/2009  | Futagi et al. .................. 370/335 |
| 2010/0278151 | A1* | 11/2010 | Oh et al. ....................... 370/335 |
| 2012/0064854 | A1* | 3/2012  | Youn et al. ................. 455/404.1 |

FOREIGN PATENT DOCUMENTS

| CN | 100548064 C       | 10/2009 |
| KR | 10-2008-0079961 A | 9/2008  |
| KR | 10-2008-0093858 A | 10/2008 |
| KR | 10-2009-0040119 A | 4/2009  |
| KR | 10-2009-0090941 A | 8/2009  |

* cited by examiner

*Primary Examiner* — Jae Y Lee
*Assistant Examiner* — Alan Lindenbaum
(74) *Attorney, Agent, or Firm* — Jefferson IP Law, LLP

(57) ABSTRACT

A method and an apparatus of requiring uplink resources for transmitting a ranging request message in a communication system are provided. The method includes allocating an uplink bandwidth from a base station, and fragmentizing a Ranging Request (RNG-REQ) message into plural fragmented RNG-REQ messages, when the allocated bandwidth does not accommodate an entire RNG-REQ message, requesting an additional uplink bandwidth by transmitting one fragmented RNG-REQ message, and allocating an requested additional uplink bandwidth from the base station and transmitting a next one fragmented RNG-REQ message.

16 Claims, 24 Drawing Sheets

| INFORMATION CONTAINED IN MESSAGE (VALUE) | | | LENGTH |
|---|---|---|---|
| MESSAGE TYPE = 1 | | | 8 bits |
| DOWNLINK CHANNEL ID | | | 8 bits |
| TYPE | LENGTH | VALUE | |
| 1 | 1 | REQUESTED DOWNLINK BURST PROFILE | 3 bits |
| 2 | 6 | SS MAC ADDRESS | 8 bits |
| 3 | 1 | RANGING ANOMALIES | 3 bits |
| 148 | 1 | MAC VERSION | 3 bits |
| 5 | 1 | SERVING BS ID | 3 bits |
| 6 | 1 | HO INDICATION | 3 bits |
| 7 | 1 | HO ID | 3 bits |
| 9 | 1 | LOCATION UPDATE REQUSET | 3 bits |
| 7 | 6 | PAGING CONTROLLER ID | 8 bits |
| 149 | 21 | HMAC TUPLE | 23 bits |
| 21 | VARIABLE | POWER SAVING CLASS PARAMETERS | VARIABLE |
| | 1 | POWER DOWN INDICATOR | 3 bits |

FIG.3
(RELATED ART)

| NAME | LENGTH(bits) | NOTES |
|---|---|---|
| HT | 1 | HEADER TYPE = 1 |
| EC | 1 | ALWAYS SET TO ZERO |
| TYPE | 3 | INDICATES THE TYPE OF BANDWIDTH REQUEST HEADER |
| CID | 16 | INITIAL RANGING CID |
| BR | 19 | BANDWIDTH REQUEST<br>THE NUMBER OF BYTES OF UPLINK BANDWIDTH REQUESTED<br>BY THE SS, THE BANDWIDTH REQUEST IS FOR THE CID.<br>THE REQUEST SHALL NOT INCLUDE ANY PHY OVERHEAD. |
| HCS | 8 | HEADER CHECK SEQUENCE |

FIG.7

| SYNTAX | SIZE (bits) | NOTES |
|---|---|---|
| CDMA_ALLOCATION_A-MAP IEO { | | - |
| A-MAP IE TYPE | 4 | CDMA ALLOCATION A-MAP IE |
| IF MCRC IS MASKED WITH RAID AND MASKING INDICATOR OFR BR { | | |
| RESOURCE ASSIGNMENT INFORMATION | TBD | |
| HFA | 4 | HARQ FEEDBACK ALLOCATION [IF ABS ASSIGNS HFA IMPLICITLY, THIS PARAMETER IS UNNECESSARY.] |
| POWER LEVEL ADJUST | 4 | RELATIVE CHANGE IN TRANSMISSION POWER LEVEL. SIGNED IN UNITS IF 1 dB |
| RESERVED | TBD | |
| } | | |
| ELSE IF MCRC IS MASKED WITH RAID AND MASKING INDICATOR FOR RANGING { | | |
| RESOURCE ASSIGUMENT INFORMATION | TBD | |
| HFA | 4 | HARQ FEEDBACK ALLOCATION |
| TIMING ADJUST | 10 | AMOUNT OF ADVANCE TIME REQUIRED TO ADJUST AMS TRANSMISSION. UNSIGNED IN UNITS OF 1/Fs |
| POWER LEVEL ADJUST | 4 | RELATIVE CHANGE IN TRANSMISSION FREQUENCY. SIGNED IN UNITS OF 1 dB |
| OFFSET FREQUENCY ADJUST | 6 | RELATIVE CHANGE IN TRANSMISSION FREQUENCY. SIGNED IN UNITS OF Hz |
| RESERVED | TBD | |
| } | | |
| MCRC | 16 | CRC MASKED BY RA-ID AND MASKING INDICATOR |
| } | - | |

FIG.8

| SYNTAX | SIZE (bit) | NOTES |
|---|---|---|
| PBREH() { | | |
| LAST | 1 | LAST EXTENDED HEADER INDICATION<br>0 : ONE OR MORE EXTENDED HEADER FOLLOWS THE CURRENT EXTENDED HEADER UNLESS SPECIFIED OTHERWISE;<br>1 : THIS EXTENDED HEADER IS THE LAST EXTENDED HEADER UNLESS SPECIFIED OTHERWISE |
| TYPE | TBD | PBREH TYPE |
| DO { | | |
| FID | 4 | FLOW IDENTIFIER |
| REQUEST TYPE | 1 | 0 : AGGREGATE<br>1 : INCREMENTAL |
| BR SIZE | 19 | AMOUNT OF BANDWIDTH REQUESTES |
| END | 1 | INDICATION OF MORE INFORMATION:<br>0 : ANOTHER "FID", "REQUEST TYPE", AND "BR SIZE" FIELDS FOLLOW<br>1 : NO MORE "FID", "REQUEST TYPE", OR "BR SIZE" FIELDS FOLLOW |
| } WHILE (!END) | | |
| RESERVED | VARIABLE | PADDING FOR BYTE ALIGNMENT |
| } | | |

FIG.13

| INFORMATION CONTAINED IN MESSAGE (VALUE) | | | LENGTH |
|---|---|---|---|
| MESSAGE TYPE = 1 | | | 8 bits |
| DOWNLINK CHANNEL ID | | | 8 bits |
| TYPE | LENGTH | VALUE | |
| 1 | 1 | REQUESTED DOWNLINK BURST PROFILE | 3 bits |
| 2 | 6 | SS MAC ADDRESS | 8 bits |
| 1 | | REQUESTED BANDWIDTH FOR NEXT RANGING REQUEST | |

FIG.15

| NAME | TYPE | LENGHT | |
|---|---|---|---|
| TIMING ADJUST | 1 | 4 | TLV ELEMENTS INPUTTED TO RNG-RSP AT TIME OF NETWORK ENTRY |
| POWER LEVEL ADJUST | 2 | 1 | |
| OFFSET FREQUENCY ADJUST | 3 | 4 | |
| RANGING STATUS | 4 | 1 | |
| DOWNLINK FREQUENCY OVERRIDE | 5 | 4 | |
| UPLINK CHANNEL ID OVERRIDE | 6 | 1 | |
| DOWNLINK OPERATIONAL BURST PROFILE | 7 | 2 | |
| SS MAC ADDRESS | 8 | 6 | |
| BASIC CID | 9 | 2 | |
| PRIMARY MANAGEMENT CID | 10 | 2 | |
| AAS BROADCAST PERMISSION | 11 | 1 | |
| RANGING CODE ATTRIBUTES | 150 | 1 | |
| SERVICE LEVEL PREDICTION | 17 | 1 | TLV ELEMENTS INPUTTED TO RNG-RSP AT TIME OF HANDOFF |
| GLOBAL SERVICE CLASS NAME | 18 | 4 | |
| QOS PARAMETERS | [145/146] VARIABLE | VARIABLE | |
| SFID | [145/146].1 | 4 | |
| RESOURCE RETAIN FLAG | 20 | 1 | |
| HO PROCESS OPTIMIZATION | 21 | 2 | |
| HO ID | 22 | 1 | |
| LOCATION UPDATE RESPONSE | 23 | 4 | |
| PAGING INFORMATION | 24 | 5 | |
| PAGING CONTROLLER ID | 25 | 6 | |
| NEXT PERIODIC RANGING | 26 | 2 | |
| POWER-SAVING-CLASS-PARAMETERS | | VARIABLE | |

FIG.19

METHOD AND APPARATUS OF REQUIRING UPLINK RESOURCES FOR TRANSMITTING RANGING REQUEST MESSAGE IN COMMUNICATION SYSTEM

PRIORITY

This application claims the benefit under 35 U.S.C. §119(a) of a Korean patent application filed in the Korean Intellectual Property Office on Oct. 30, 2009 and assigned Serial No. 10-2009-0104170, the entire disclosure of which is hereby incorporated by reference.

BACKGROUND OF THE INVENTION

1. Field of the Invention

The present invention relates to a ranging procedure in a communication system. More particularly, the present invention relates a method and an apparatus of requiring uplink resources needed in transmitting a ranging request message, when a subscriber station in a communication system enters into a network.

2. Description of the Related Art

Recently, the Institute of Electrical and Electronics Engineers (IEEE) 802.16 standardization group, one of the international organization for standardization, has been researching a wireless access method in a broadband wireless communication system.

FIG. 1 illustrates a configuration of a broadband wireless communication system according to the related art. Referring to the FIG. 1, a Subscriber Station (SS) 10 has mobility and is connected to a backbone network 30 via a Base Station (BS) 20. The base station 20 provides control, management and connectivity over the subscriber station 10, and the backbone network 30 is connected to an Authentication and Service Authorization (ASA) Server 40 for authentication of the subscriber station 10 and service authentication.

The above-described broadband wireless communication system performs a ranging process for setting precise time and a frequency offset between the base station 20 and the subscriber terminal 10, and correcting transmission power of a subscriber station.

The ranging procedure may be divided into initial ranging, periodic ranging, bandwidth request ranging, and handover ranging based on the procedure purpose. The initial ranging is conducted when a subscriber station first accesses to a network after power-on, and the periodic ranging is conducted per a certain period as needed after the subscriber station completes a network entering process. Also, the bandwidth request ranging is performed when a subscriber station requires a new bandwidth, and the handover ranging is performed for fast network re-entry of the subscriber station to a target base station at hand-over. A ranging procedure, for example, an initial ranging procedure, will be described below with reference to FIG. 2.

FIG. 2 illustrates an initial ranging procedure of a subscriber station in a broadband wireless communication system according to the related art.

Referring to the FIG. 2, the subscriber station 10 transmits an initial ranging code to a base station in a contention based method in step 101. Herein, a transmitted ranging code is differently determined according to ranging objects. That is, the subscriber terminal initiates a ranging procedure by being allocated a different ranging code for the aforementioned four divisions through an Uplink Channel Descriptor (UCD), and transmitting a ranging code suitable for objects of the ranging procedure into an area allocated through an Uplink MAP (UL-MAP).

The base station 20 that received the initial ranging code performs a correction action of time, frequency, and transmission power of the received ranging code, and after generating a Ranging Response (RNG-RSP) message including the time, the frequency and a power offset adjusting value, the base station 20 transmits a generated RNG-RSP message in consideration of a Random Access Identifier (RAID) produced from code ranging information transmitted from the subscriber station 10 in step 103. Thereafter, the subscriber station 10 confirms a received message and adjusts the power offset considering the RAID produced from code ranging information when the RNG-RSP message is received, wherein the subscriber station re-transmits an initial ranging code when a status field of the RNG-RSP message is 'continue' in step 105.

Thereafter, when the base station determines that the time and the power adjustment through a ranging code re-transmitted by the subscriber station 10 is completed, the base station marks a status field of the RNG-RSP message as 'success' and transmits the same in step 107, and allocates uplink resources (i.e., UpLink (UL) bandwidth or UL duration) for an RNG-REQ message transmission of the subscriber station 10 through a UL-MAP having a Code Division Multiple Access (CDMA)_Allocation_IE in step 109.

On the other hand, the subscriber station 10 completes a code ranging procedure when a status field of the RNG-RSP message received from the base station 20 is 'success', and attempts a message ranging procedure by transmitting the RNG-REQ message through the allocated uplink bandwidth in step 111. At this time, the RNG-REQ message may be configured as illustrated in FIG. 3.

FIG. 3 is a diagram describing parameter information including a Ranging Request (RNG-REQ) message according to the related art.

A parameter type and a total number contained in the RNG-REQ message varies pursuant to network entry or network re-entry objectives of the subscriber station 10. For example, at the time of network entry, because a subscriber station accesses a base station first and thus no previous Serving Base Station (BS) exists, there is no need for a Serving BS ID and a Station ID. Since the size of the RNG-REQ message varies by necessity/unnecessary parameters, the base station 20 must allocate a sufficient uplink bandwidth not to be short of a bandwidth when the subscriber station 10 transmits the RNG-REQ message.

Thereafter, when the base station 20 transmits the RNG-RSP message in step 113 and the subscriber station 10 receives the same and transmits a Subscriber Station Basic Capability Request (SBC-REQ) message to the base station 20 to perform a capabilities negotiation procedure. Thereafter, the ranging procedure ends. At this time, the IEEE 802.16m standard system is arranged such that the RNG-REQ message transmitted from the subscriber station 10 includes a Mobile Station (MS) random instead of Media Access Control (MAC) address, wherein the MS random is used to discern each RNG-REQ message when the base station 20 receives RNG-REQ messages from several subscriber stations. Also, the IEEE 802.16m standard system is arranged such that through the ranging procedure a subscriber station 10 is allocated a Temporary Station ID (TSTID) from the base station 20.

As described above, the size of the RNG-REQ message may vary according to circumstances at the time of a ranging procedure of the subscriber station 10, and thus the base station 20 must allocate an uplink bandwidth suitable for the size of the RNG-REQ message to be transmitted by the subscriber station. A ranging code is divided four ways so that the base station 20 may allocate uplink resources needed in transmitting the RNG-REQ message by the subscriber station 10 by approximate guessing. However, there is a limit in assigning uplink resources by only the ranging code owing to a case of not belonging to the four kinds of ranging procedures.

For example, the subscriber station 10 searches a new base station and performs a network re-entry process, due to a link loss between the subscriber station 10 and the base station 20. At this time, since a conducted network re-entry process uses an initial ranging code, the base station 20 may not discriminate whether to be a subscriber station attempting at an initial network entry, or be a subscriber station attempting at a network re-entry owing to a link loss only by a ranging code transmitted by the subscriber station 10. In the end, it becomes unclear of how much uplink resources the base station should allocate a corresponding subscriber station through the ranging code.

In addition, even when a same ranging procedure is conducted, necessary uplink resources per subscriber station may vary. For example, when the subscriber station 10 has not updated security information during a link loss, the subscriber station 10 may not include security information in the RNG-REQ message, so that size of the RNG-REQ message varies compared to other stations performing the same ranging procedure.

When uplink resources allocated from the subscriber station 20 are smaller than the size of the RNG-REQ message to be transmitted, the related art uses a method of dividing and transmitting data to be actually transmitted by the subscriber station. However, since this method requires that the subscriber station 10 perform a code-based Bandwidth Request (BR), that is a bandwidth request ranging of a lacking resource based on code, to transmit remaining data after the subscriber station 10 is allocated a Temporary Station ID through the RNG-RSP message from the base station 20, the problem exists that a long time is needed to complete a network entry/re-entry procedure due to an additional ranging and a related allocation.

Therefore, a need exists for a method and apparatus for reducing time required for a complete network entry/re-entry procedure in a communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for requiring uplink resources needed in transmitting a ranging request message, in a communication system when a subscriber station enters into a network.

Another aspect of the present invention is to provide a method and an apparatus for requesting uplink resources by transmitting a bandwidth request header through an allocated uplink resource, when allocated uplink resources are smaller than the size of a ranging request message to be transmitted in a communication system when a subscriber station enters a network.

Still another aspect of the present invention is to provide a method and an apparatus for requesting lacking uplink resources using a ranging request message, when allocated uplink resources are smaller than the size of a ranging request message to be transmitted in a communication system when a subscriber station enters a network.

In accordance with an aspect of the present invention, a method of a subscriber station for requesting uplink resources to transmit a ranging request message in a communication system is provided. The method includes allocating an uplink bandwidth from a base station, fragmentizing a Ranging Request (RNG-REQ) message into plural fragmented RNG-REQ messages, when the allocated bandwidth does not accommodate an entire RNG-REQ message, additionally requesting an uplink bandwidth by transmitting one fragmented RNG-REQ message, and allocating an additionally requested uplink bandwidth from the base station and transmitting a next fragmented.

In accordance with another aspect of the present invention, a method of a base station for allocating uplink resources to transmit a ranging request message in a communication system is provided. The method includes allocating an uplink bandwidth to a subscriber station, receiving one fragmented RNG-REQ message from the subscriber station that requests an additional allocation of an uplink bandwidth, and allocating an additionally requested uplink bandwidth to the subscriber station.

In accordance with still another aspect of the present invention, an apparatus of a subscriber station for requesting uplink resources to transmit a ranging request message in a communication system is provided. The apparatus includes a transmission/reception unit processing a message transceived with a base station, and control unit for fragmentizing an RNG-REQ message into plural fragmented RNG-REQ messages, for additionally requesting an uplink bandwidth through one fragmented RNG-REQ message, and for allocating an additionally requested uplink bandwidth from the base station, when an uplink bandwidth from the base station is allocated and the allocated bandwidth does not accommodate an entire RNG-REQ message.

In accordance to yet another aspect of the present invention, an apparatus of a base station for allocating uplink resources to transmit a ranging request message in a communication system is provided. The apparatus includes a transmission/reception unit for processing a message transceived with a subscriber station, and a control unit for allocating an uplink bandwidth to a subscriber station, for receiving one fragmented RNG-REQ message from the subscriber station that requests an additional allocation of an uplink bandwidth, and for allocating an additionally requested uplink bandwidth to the subscriber station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a diagram describing parameter information including a Ranging Request (RNG-REQ) message according to the related art;

FIG. 7 is a diagram illustrating parameter information including a bandwidth request header according to an exemplary embodiment of the present invention;

FIG. 8 is a diagram illustrating a format of a Code Division Multiple Access (CDMA)_allocation_IE informing a bandwidth allocation according to an exemplary embodiment of the present invention;

FIG. 13 is a diagram illustrating a format of Piggyback Bandwidth Request Extended Header (PBREH) according to an exemplary embodiment of the present invention;

FIG. 15 is a diagram illustrating parameter information included in a ranging request message according to an exemplary embodiment of the present invention;

FIG. 19 is a diagram illustrating parameter information included in a Ranging Response (RNG-RSP) message at the time of a network reentry and a handover according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
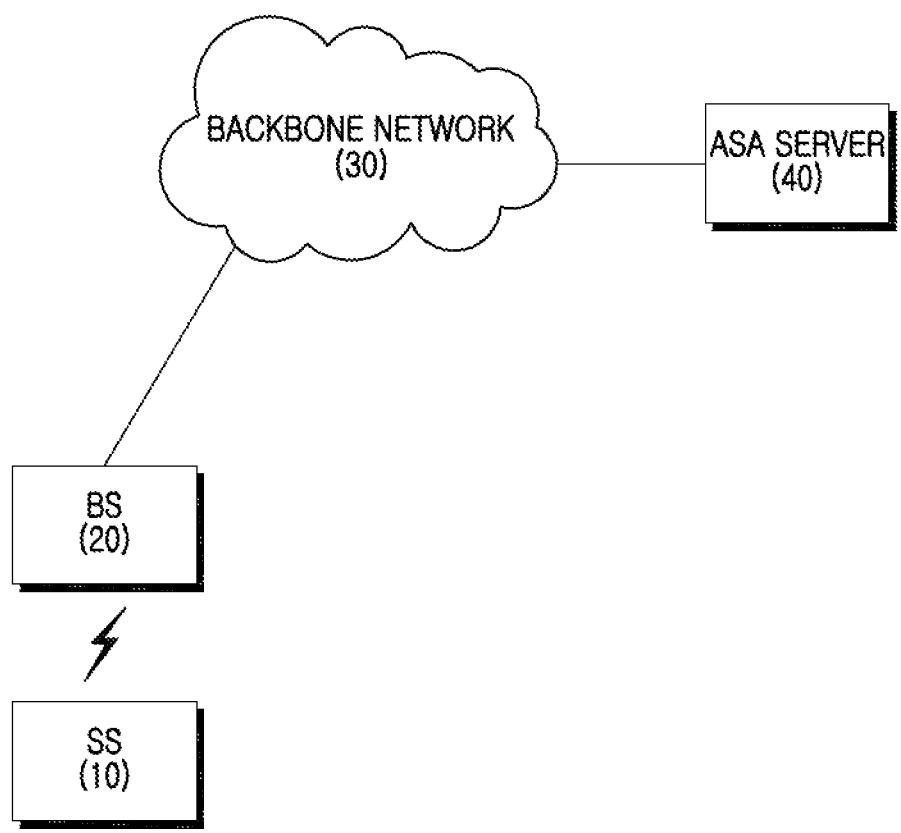
FIG. 1 illustrates a configuration of a broadband wireless communication system according to the related art.
Figure 2:
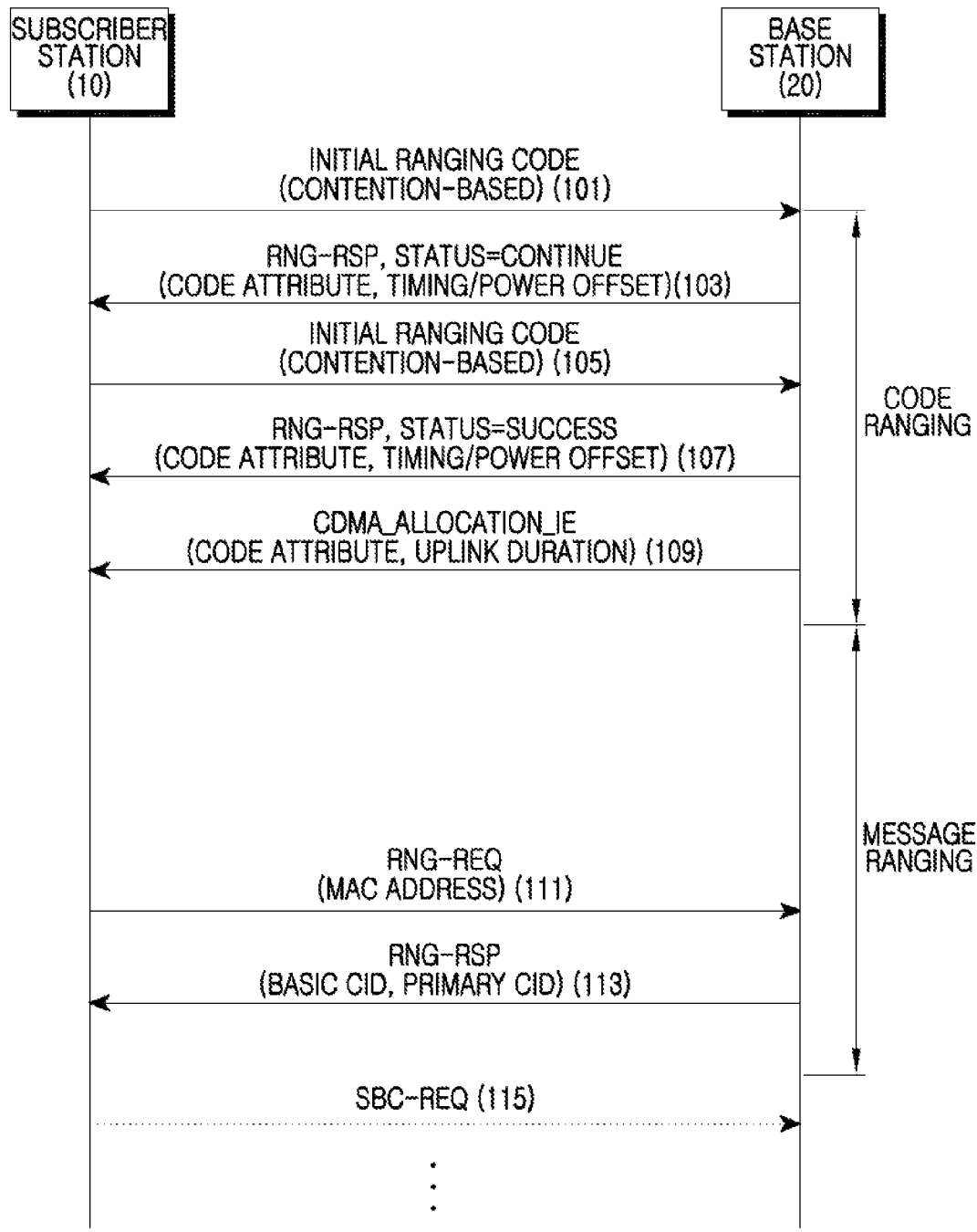
FIG. 2 illustrates an initial ranging procedure of a subscriber station in a broadband wireless communication system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, exemplary embodiments of the present provide a method and an apparatus of requesting uplink resources needed in transmitting a ranging request message in a communication system when a subscriber station enters a network. Hereinafter, the exemplary embodiments of the present invention will be described in the context of system operating according to the Institute of Electrical and Electronics Engineers (IEEE) 802.16m standard as an example. However, the present invention may be applied to another communication system. Also, the following description will describe an initial ranging procedure as an example. However, the present invention may be applied to other ranging procedures.

In the following description, the exemplary embodiments of the present invention provide five methods that a subscriber station is allocated uplink resources for transmitting a ranging request message from a base station when the subscriber station enters a network entry or re-entry.

First, when uplink resources allocated to a subscriber station from a base station are smaller than the size of a Ranging Request (RNG-REQ) message to be transmitted, the subscriber station is newly allocated uplink resources from the base station by transmitting a bandwidth request message through the allocated uplink resource. Herein, the bandwidth request message includes a bandwidth request header similar to the header shown in Table 1. Since the subscriber station is not allocated a Temporary Station IDentifier (ID), the bandwidth request header is configured not to include the temporary subscriber station ID.

TABLE 1

| Syntax | Size(bit) | Note |
| --- | --- | --- |
| BR without STID header ( ) { | | |
| FID | 4 | Flow Identifier. This field indicates MAC signaling header |
| Type | 4 | MAC signaling header type. |
| BR Type | 1 | Indicates whether the requested bandwidth is incremental or aggregate:<br>0: incremental.<br>1: aggregate. |
| BR Size | 19 | Bandwidth request size in bytes |
| BR FID | 4 | The FID for which UL bandwidth is requested |
| TI | 1 | 0: No Tx Power report<br>1: Tx Power information present |
| If( TI == 1) {  | | |
| UL Tx Power | 8 | |
| Reserved | 7 | Shall be filled by 0 |
| } else { | | |
| Reserved | 15 | Shall be filled by 0 |
| } | | |

Herein, a Bandwidth Request Flow IDentifier (BR FID) uses 0x0 denoting Basic Flow ID, the BR type uses Aggregate, and the BR size uses the size of an RNG-REQ message.

Then, a procedure of newly requesting uplink resources by transmitting a bandwidth request message containing a bandwidth request message as shown in Table 1 through uplink resources allocated to the subscriber station will be described below with reference to FIGS. 4 through 6.

Figure 4:
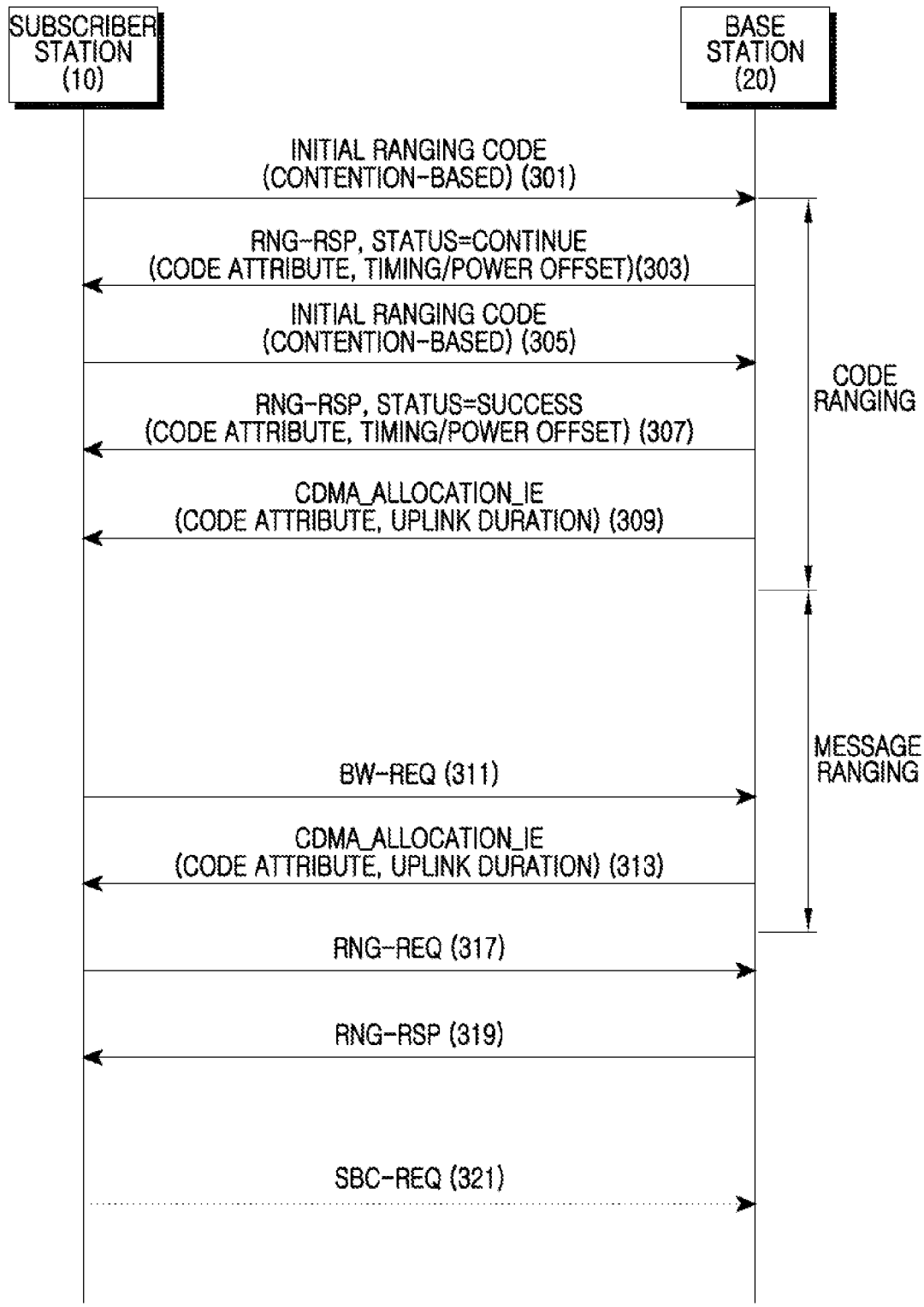
FIG. 4 illustrates a ranging procedure in a communication system according to an exemplary embodiment of the present invention.

FIG. 4 illustrates a ranging procedure in a communication system according to an exemplary embodiment of the present invention.

Referring to the FIG. 4, the subscriber station 10 transmits an initial ranging code to a base station in a contention way in step 301. A base station 20 that received the initial ranging code performs a correction action of time, frequency, and transmission power of the received ranging code, generates a Ranging Response (RNG-RSP) message containing time, frequency and a power offset adjustment value, and then transmits a generated RNG-RSP message in consideration of a Random Access ID (RAID) produced from code ranging information transferred by a subscriber station 10 in step 303.

The base station 20 allocates uplink resources (i.e., UpLink (UL) bandwidth or UL duration) for the RNG-REQ message transmission of the subscriber station 10 through a UL-MAP including a Code Division Multiple Access (CDMA)_Allocation_IE in step 309. Herein, the base station 20 does not precisely recognize each subscriber station, but when recognizing that a specific subscriber station performs a network entry or an initial network entry, the base station 20 allocates uplink resources to a corresponding station through the CDMA_Allocation_IE. Here, the CDMA_Allocation_IE may be configured as illustrated in FIG. 8.

FIG. 8 is a diagram illustrating a format of a Code Division Multiple Access (CDMA)_allocation_IE informing a bandwidth allocation according to an exemplary embodiment of the present invention.

On the other hand, the subscriber station 10 finishes a code ranging procedure when the RNG-RSP message is received from the base station, and initiates a ranging procedure. At this time, the subscriber station 10 determines if the size of the allocated uplink resources is smaller than the size of the transmitted RNG-REQ message by comparing the size of the allocated uplink resources to that of an RNG-REQ message to be transmitted to the base station 20.

If it is determined that the size of the allocated uplink resources is smaller than the size of the transmitted RNG-REQ message, the subscriber station 10 requests an allocation of an uplink bandwidth suitable for the transmitted RNG-REQ message by transmitting a Bandwidth Request (BW-REQ) message containing a bandwidth request header as shown in Table 1 to the base station 20 in step 311. At this time, the subscriber station 10 sets the BR FID of the RNG-REQ message to 0x0 (i.e., FID for initial ranging) or another value. Here, the bandwidth request header may be configured to include parameters as illustrated in FIG. 7.

FIG. 7 is a diagram illustrating parameter information including a bandwidth request header according to an exemplary embodiment of the present invention.

A base station 20 that received the BW-REQ message transmits the CDMA_Allocation_IE newly allocating an uplink bandwidth that corresponds to a BR Size contained in the bandwidth request message to the subscriber station 10 in step 313. That is, when the BW-REQ message is received through uplink resources allocated to the subscriber station 10, the base station 20 determines that the subscriber station 10 needs more resources and newly allocates uplink resources through the CDMA_Allocation_IE that corresponds to as requested by the subscriber station 10.

The subscriber station 10 then transmits an RNG-REQ message to the base station 20 through the newly allocated uplink bandwidth in step 317, and the base station 20 transmits the RNG-RSP message to the subscriber station 10 in step 319. Here, when the subscriber station 10 receives the RNG-RSP message, the ranging procedure ends.

Thereafter, the subscriber station 10 transmits a Subscriber Station (SS) Basic Capability Request (SBC-REQ) message to the base station 20 to perform a capabilities negotiation procedure similar to the related art in step 321.

Figure 5:
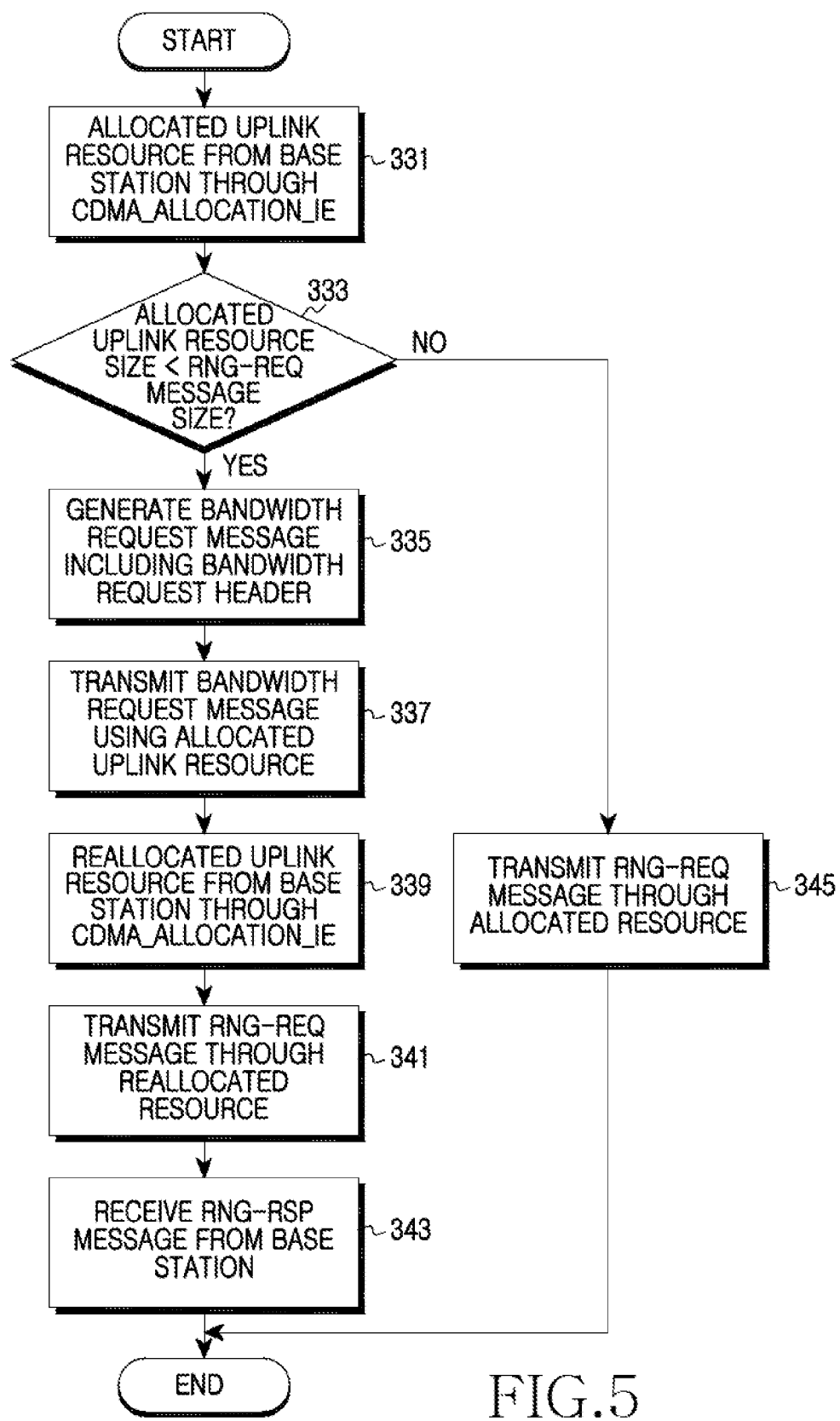
FIG. 5 illustrates a ranging procedure of a subscriber station in a communication system according to an exemplary embodiment of the present invention.

FIG. 5 illustrates a ranging procedure of a subscriber station in a communication system according to an exemplary embodiment of the present invention.

Herein, a procedure of a subscriber station 10 transmitting a ranging code and being allocated uplink resources through a CDMA_Allocation_IE from a base station is similar to the related art. Therefore, a description thereof will be omitted.

Referring to the FIG. 5, the subscriber station 10 is allocated uplink resources for transmission of an RNG-REQ message through a CDMA_Allocation_IE from a base station in step 331 and determines if the size of the allocated uplink resources is smaller than the size of a transmitted RNG-REQ message in step 333. If it is determined that the size of the allocated uplink resources is greater or equal to the size of a transmitted RNG-REQ message, the subscriber station 10 transmits an RNG-REQ message through the allocated uplink resource in step 345 and the procedure ends.

On the other hand, if it is determined that the size of the allocated uplink resource is smaller than the size of a transmitted RNG-REQ message, the subscriber station 10 generates a BandWidth Request (BW-REQ) message containing a bandwidth request header as shown in Table 1 in step 335 and transmits the BW-REQ message to a base station through the allocated uplink resource in step 337. At this time, the bandwidth request message includes a bandwidth request header indicating bandwidth size information needed in transmission of the RNG-REQ message as shown in Table 1.

Thereafter, the subscriber station 10 is re-allocated uplink resources through the CDMA_Allocation_IE from the base station in step 339 and transmits the RNG-REQ message through the reallocated uplink resources in step 341. The subscriber station 10 then receives an RNG-RSP message from the base station in step 343. Thereafter, the procedure ends.

Figure 6:
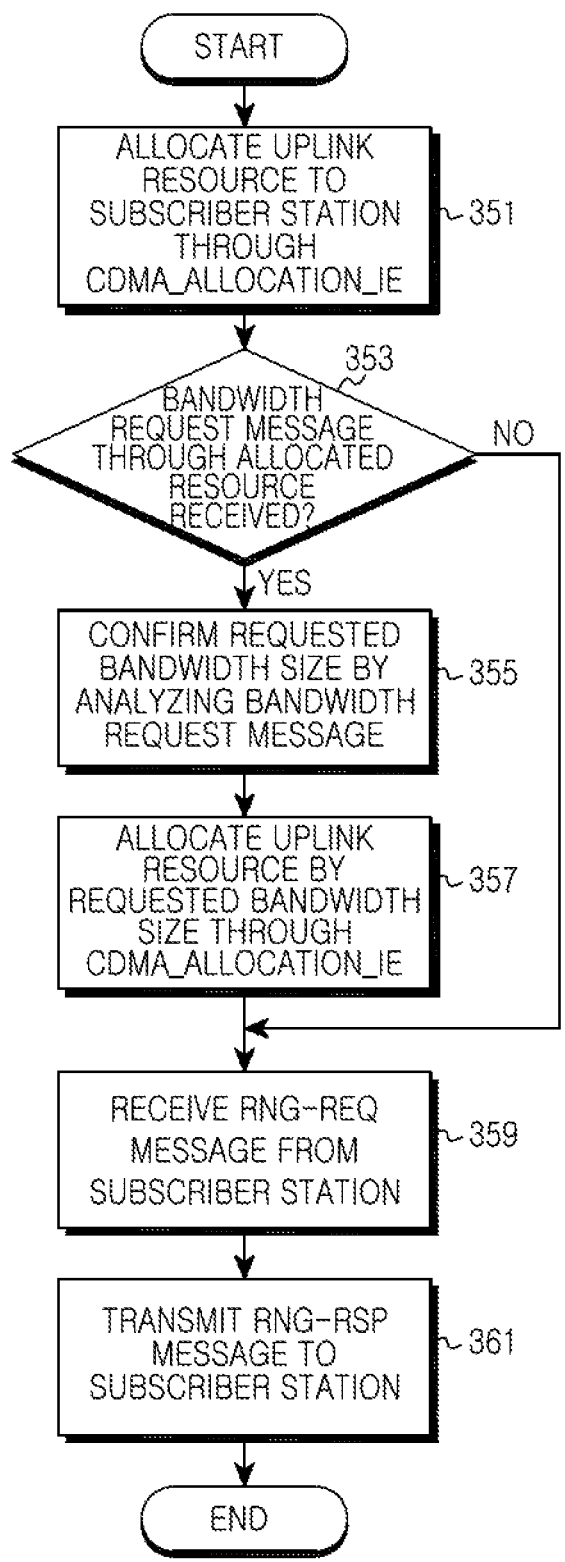
FIG. 6 illustrates a ranging procedure of a base station in a communication system according to an exemplary embodiment of the present invention.

FIG. 6 illustrates a ranging procedure of a base station in a communication system according to an exemplary embodiment of the present invention.

Herein, a procedure of a base station 20 receiving a ranging code from a subscriber station 20 and allocating uplink resources through a CDMA_Allocation_IE is similar to the related art. Therefore, a description thereof will be omitted.

Referring to the FIG. 6, the base station 20 allocates uplink resources for transmission of an RNG-REQ message of the subscriber station 10 through the CDMA_Allocation_IE in step 351. Here, the base station 20 does not precisely recognize each subscriber station, but when recognized that a specific station performs a network entry or an initial network entry, the base station 20 allocates uplink resources to a corresponding subscriber station through the CDMA_Allocation_IE.

Thereafter, the base station 20 determines if a bandwidth request message is received through a bandwidth allocated to the subscriber station 10 in step 353. If the bandwidth request message is not received, the base station 20 operates similarly to the related art in step 359.

On the other hand, when the bandwidth request message is received, the base station 20 confirms a bandwidth size requested by the subscriber station 10 by analyzing the received bandwidth request message in step 355, and the base station 20 then allocates uplink resources corresponding to the requested bandwidth size to the subscriber station 10 through the CDMA_Allocation_IE in step 357.

Thereafter, the base station 20 receives an RNG-REQ message from the subscriber station 10 in step 359 and transmits an RNG-RSP message to the subscriber station 10 in step 361. Thereafter, the procedure ends.

Second, when uplink resources allocated to a subscriber station from a base station are smaller than the size of an RNG-REQ message to be transmitted, the subscriber station is additionally allocated uplink resources from the base station by requesting additionally needed uplink resources using the RNG-REQ message. That is, the subscriber station divides the RNG-REQ message, and contains a parameter that indicates the size of an additionally needed bandwidth as shown in Table 2 below into a first divided RNG-REQ message. The subscriber station then transmits the parameter to the base station through the allocated uplink resources, so that the subscriber station is additionally allocated uplink resources from the base station and transmits a remaining divided RNG-REQ message through the additionally allocated uplink resources. Herein, the RNG-REQ message includes a parameter indicating Mobile Station (MS)-Random or Media Access Control (MAC) address so that the base station may distinguish the subscriber station.

TABLE 2

| Syntax | Size(bit) | Note |
|---|---|---|
| Additionally required Bandwidth for 2nd RNG-REQ message | TBD | Bandwidth request size in bytes |

Herein, the additionally required bandwidth for a second RNG-REQ message indicates an uplink bandwidth that a subscriber station additionally needs to transmit a remaining data which is not transferred through a firstly transmitted RNG-REQ message.

A procedure of the subscriber station requesting an additional allocation of uplink resources using a divided RNG-REQ message will be described below with reference to FIGS. 9 through 11.

Figure 9:
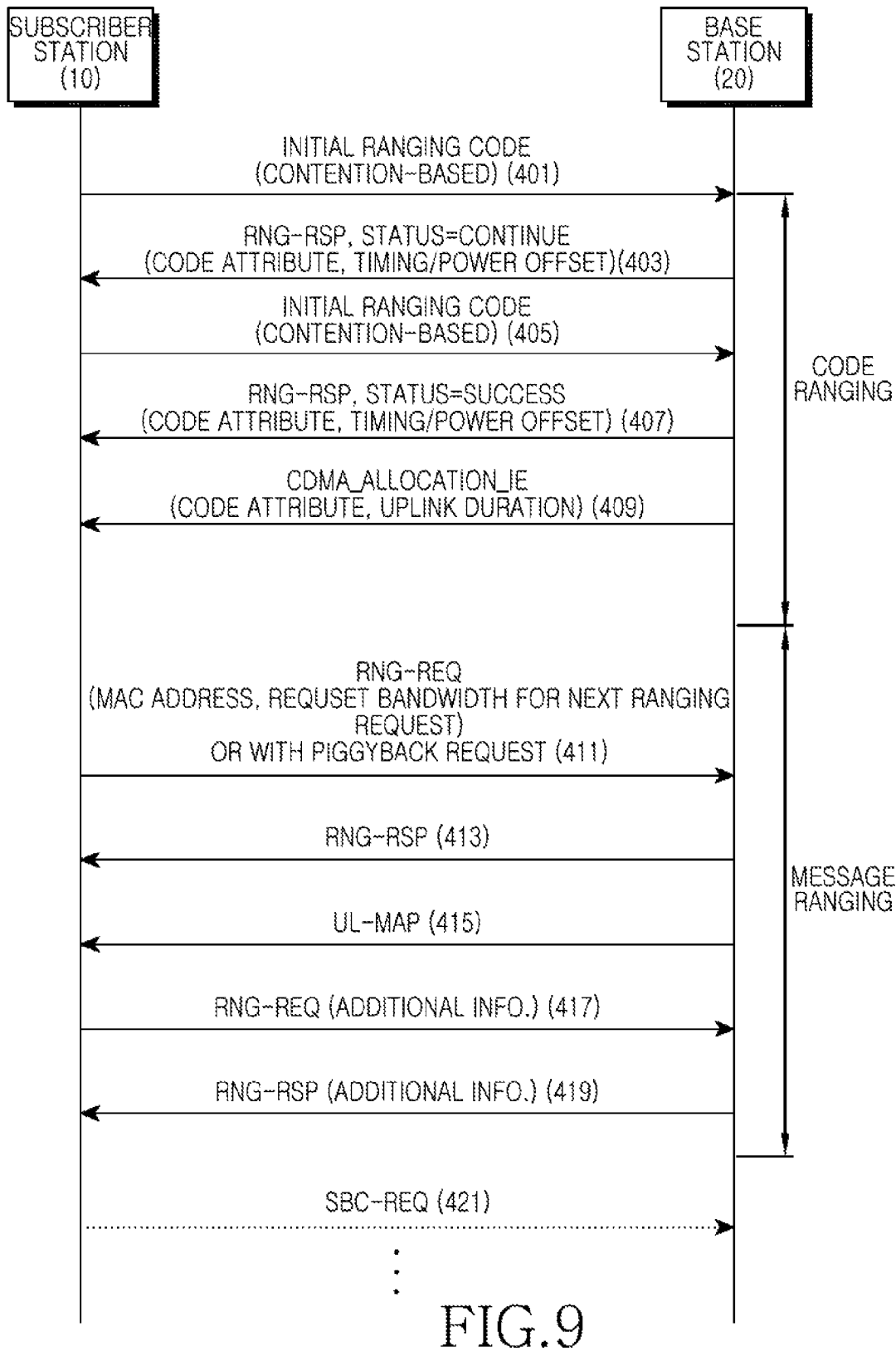
FIG. 9 illustrates a ranging procedure of a communication system according to an exemplary embodiment of the present invention.

FIG. 9 illustrates a ranging procedure of a communication system according to an exemplary embodiment of the present invention.

Hereinafter, since steps 401 through 409 of FIG. 9 is the same as steps 301 through 309 of the FIG. 5, a related description will be omitted.

Referring to the FIG. 9, when the size of uplink resources allocated from the base station 20 is smaller than the size of an RNG-REQ message to be transmitted, the subscriber station 10 divides the RNG-REQ message, contains a parameter indicating the size of an additionally needed uplink bandwidth as indicated in the Table 2 into a first divided RNG-REQ message and then transmits the parameter through uplink resources allocated in the step 409 to the base station 20 in step 411. That is, the subscriber station 10 may generate an RNG-REQ message including a parameter 450 requesting a bandwidth for a next RNG-REQ message as illustrated in FIGS. 14 and 15, and transmit a Media Access Control (MAC) Protocol Data Unit (MPDU) containing the RNG-REQ message to the base station 20.

Figure 14:
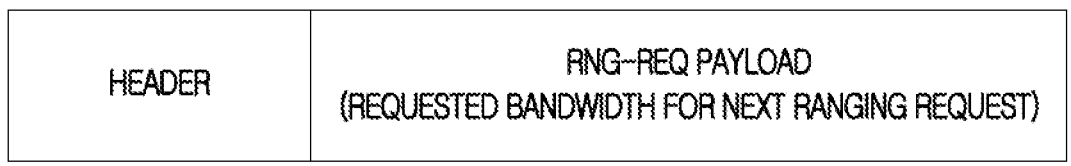
FIG. 14 is a diagram illustrating a form of MPDU generally including a ranging request message according to an exemplary embodiment of the present invention.

FIG. 14 is a diagram illustrating a form of MPDU generally including a ranging request message according to an exemplary embodiment of the present invention. FIG. 15 is a diagram illustrating parameter information included in a ranging request message according to an exemplary embodiment of the present invention.

Herein, the RNG-REQ message is divided according to the size of uplink resources allocated in the step 409. That is, a first RNG-REQ message is eventually determined to be a size that is capable of being transmitted with the allocated uplink resources. At this time, the first RNG-REQ message includes a parameter indicating MS_Random or MAC address so that the base station may distinguish the subscriber station. Herein, the subscriber station 10 may add a Piggybacked Bandwidth Request Extended Header (PBREH) as illustrated in FIGS. 12 and 13 into the RNG-REQ message.

Figure 12:
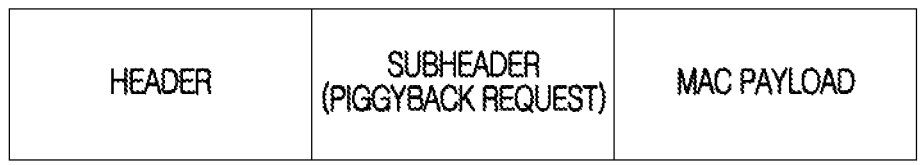
FIG. 12 is a diagram illustrating a form of including a piggyback bandwidth request extended header into a Media Access Control (MAC) Protocol Data Unit (MPDU) according to an exemplary embodiment of the present invention.

FIG. 12 is a diagram illustrating a form of including a piggyback bandwidth request extended header into a Media Access Control (MAC) Protocol Data Unit (MPDU) according to an exemplary embodiment of the present invention. FIG. 13 is a diagram illustrating a format of Piggyback Bandwidth Request Extended Header (PBREH) according to an exemplary embodiment of the present invention.

Thereafter, the base station 20 transmits an RNG-RSP message to the subscriber station in step 413, and additionally allocates an uplink bandwidth corresponding to the size requested from the subscriber station 10 through a UL_MAP in step 415.

Thereafter, the subscriber station 10 transmits a divided remaining RNG-REQ message, that is a second RNG-REQ message, to the base station 20 using the additionally allocated uplink bandwidth in step 417, and the base station 20 receiving the RNG-REQ message transmits an RNG-RSP message in step 419.

Thereafter, the subscriber station 10 transmits a SBC-REQ message to the base station 20 in step 421, and performs the following steps similarly to the related art.

Figure 10:
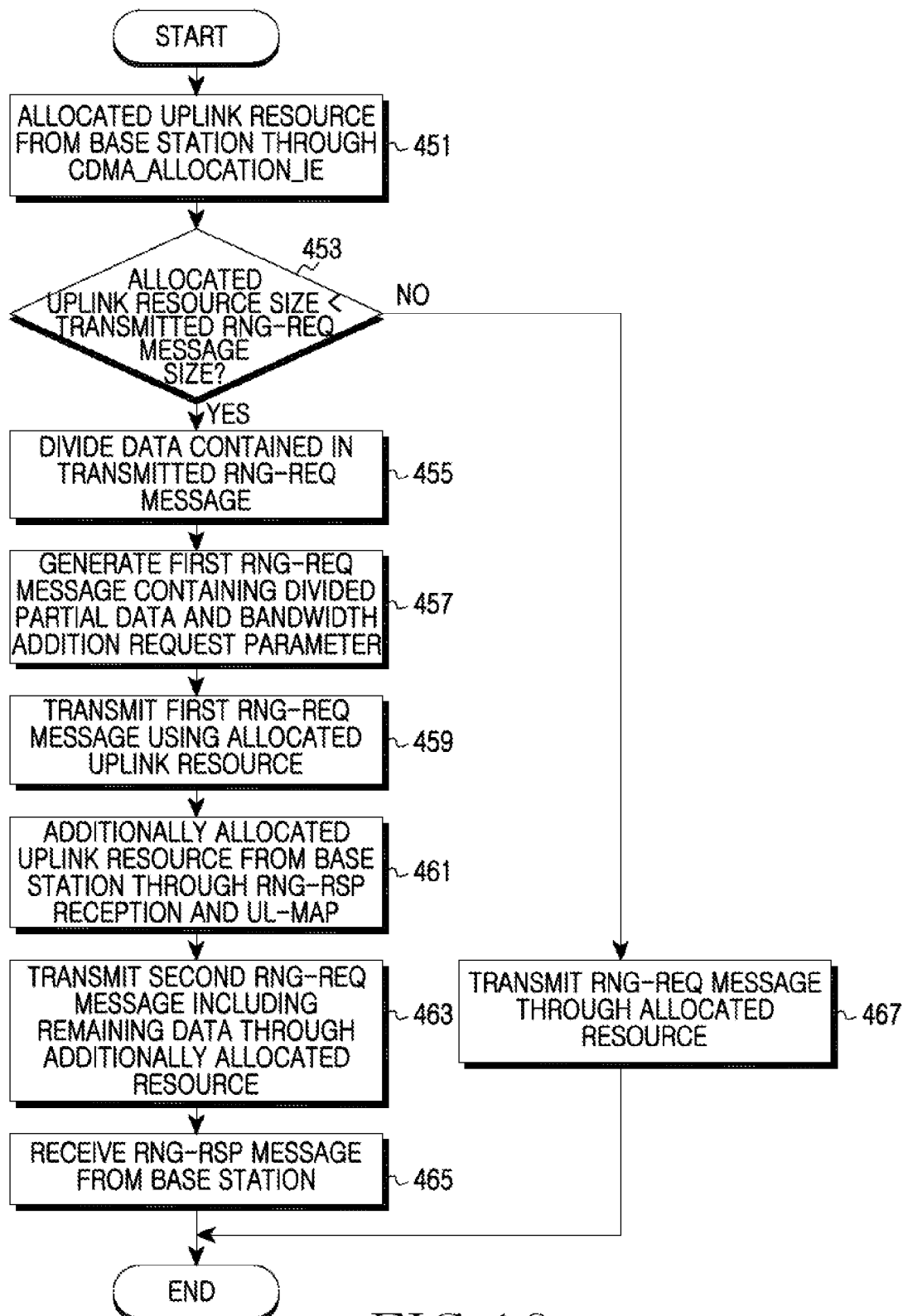
FIG. 10 illustrates a ranging procedure of a subscriber station in a communication system according to an exemplary embodiment of the present invention.

FIG. 10 illustrates a ranging procedure of a subscriber station in a communication system according to an exemplary embodiment of the invention.

Herein, a procedure of a subscriber station 10 that is allocated uplink resources through a CDMA_Allocation_IE from a base station by transmitting a ranging code is similar to the related art. Therefore, a description thereof will be omitted.

Referring to the FIG. 10, the subscriber station 10 is allocated uplink resources for transmission of an RNG-REQ message through the CDMA_Allocation_IE from a base station in step 451 and determines if the size of the allocated uplink resource is smaller than the size of an RNG-REQ message to be transmitted in step 453. If it is determined that the size of the allocated uplink resource is greater or equal to the size of a transmitted RNG-REQ message, the subscriber station transmits an RNG-REQ message through the allocated uplink resource in step 467 and ends the procedure.

On the other hand, if it is determined that the size of the allocated uplink resource is smaller than the size of the transmitted RNG-REQ message, the subscriber station 10 divides data to be included in the RNG-REQ message in step 455. Thereafter, the subscriber station 10 generates a first RNG-REQ message including a parameter indicating the size of an additionally needed uplink bandwidth as shown in Table 2 and a divided partial data in step 457. That is, the subscriber station 10 divides the RNG-REQ message into a first RNG-REQ message and a second RNG-REQ message. At this time, the first RNG-REQ message is a size that is capable of being transmitted using the allocated uplink resources, and the size of an additionally needed uplink bandwidth included in the first RNG-REQ message represents size of the second RNG-REQ message. Thereafter, the subscriber station 10 transmits the first RNG-REQ message using the allocated uplink resource in step 459. At this time, the first RNG-REQ message contains a parameter indicating MS_Random or MAC address so that a base station 20 may distinguish the subscriber station 10.

Thereafter, the subscriber station 10 receives an RNG-RSP message from a base station 20, and is additionally allocated an uplink bandwidth corresponding to a size requested by UL_MAP in step 461.

The subscriber station 10 transmits the second RNG-REQ message to the base station 20 using the additionally allocated uplink bandwidth in step 463, and receives an RNG-RSP message from the base station 20 in step 465. Thereafter, the procedure ends.

Figure 11:
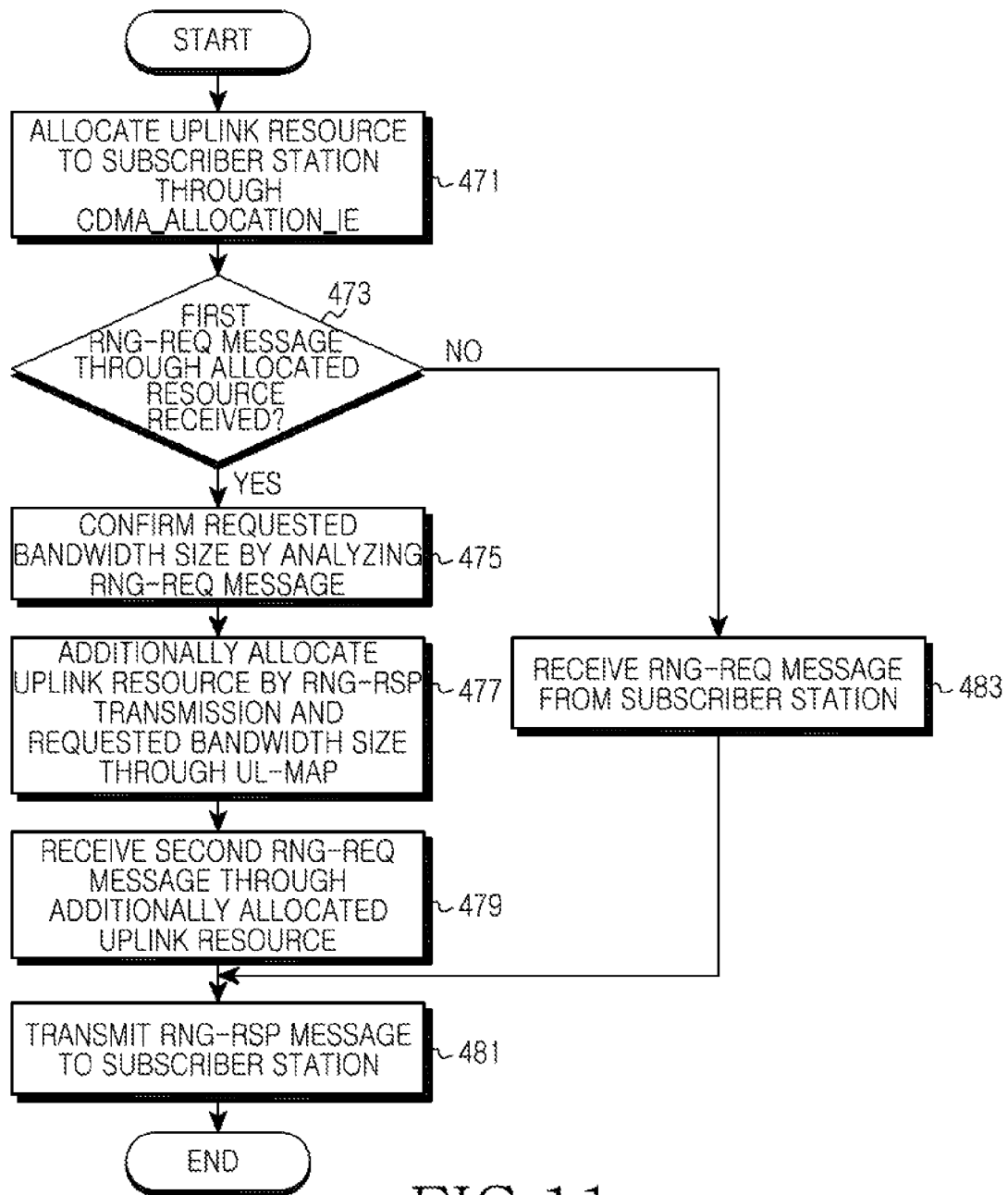
FIG. 11 illustrates a ranging procedure of a base station in a communication system according to an exemplary embodiment of the present invention.

FIG. 11 illustrates a ranging procedure of a base station in a communication system according to an exemplary embodiment of the present invention.

Herein, a procedure of a base station 20 receiving a ranging code from a subscriber station 10 and allocating uplink resources through a CDMA_Allocation_IE is similar to the related art. Therefore, a description thereof will be omitted.

Referring to the FIG. 11, the base station 20 allocates uplink resources for transmitting an RNG-REQ message of a subscriber station 10 through the CDMA_Allocation_IE in step 471. Herein, while the base station 20 does not recognize precisely each subscriber station, the base station 20 allocates uplink resources to a corresponding station through the CDMA_Allocation_IE when recognizing that a specific subscriber station performs a network entry or an initial network entry.

Thereafter, the base station 20 determines if a first RNG-REQ message is received through the allocated resource in step 473. Here, the first RNG-REQ message contains a parameter indicating the size of an additionally needed uplink bandwidth as shown in Table 2 and a parameter indicating an MS_Random or a MAC address, thereby enabling the base station 20 to distinguish the subscriber station 10 and determine if the subscriber station 10 additionally needs uplink resources. If the first RNG-REQ message is not received, the base station 20 proceeds to step 483 and operates similarly to the related art.

On the other hand, when the first RNG-REQ message is received, the base station 20 analyzes the received first RNG-REQ message and confirms a bandwidth size requested from the subscriber station 10 in step 475. Thereafter, the base station 20 transmits an RNG-RSP message to the subscriber station 10 and additionally allocates an uplink bandwidth corresponding to the requested bandwidth size through UL_MAP in step 477.

The base station 20 receives a second RNG-REQ message through the additionally allocated uplink bandwidth in step 479 and transmits an RNG-RSP message in step 481.

Thereafter, the base station 20 ends the procedure.

Third, when a link loss between a subscriber station and a base station occurs, a subscriber station of the related art employed an initial ranging code for network re-entry. However, in an exemplary implementation, uplink resources of sufficient size are allocated from a base station using a handover ranging code.

A procedure of allocating sufficient uplink resources from a base station using a handover ranging code during network re-entry will be described below with reference to FIGS. 16 through 18 when a link loss between the subscriber station and a base station occurs.

Figure 16:
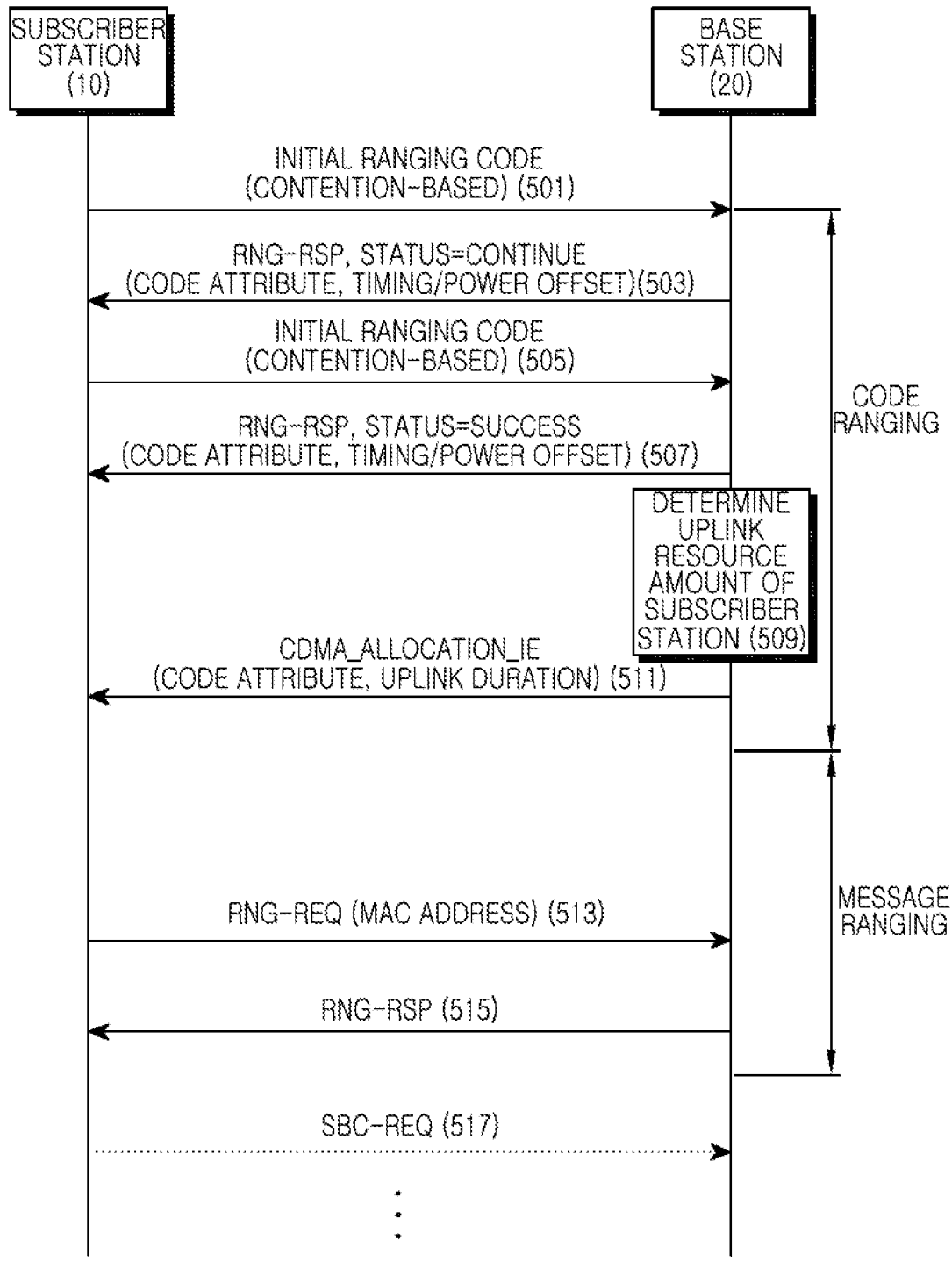
FIG. 16 illustrates a ranging procedure of a communication system according to an exemplary embodiment of the present invention.

FIG. 16 illustrates a ranging procedure of a communication system according to an exemplary embodiment of the present invention.

Referring to the FIG. 16, the subscriber station 10 retrieves a target base station for network re-entry, and then determines a handover ranging code as an initial ranging code and transmits it to the target base station 20 in step 501, when link loss with a base station occurs.

A base station 20 that received the initial ranging code performs time, frequency and transmission power of the received ranging code, generates an RNG-RSP message containing time, frequency and power offset adjustment value, and then transmits a generated RNG-RSP message in consideration of an RAID produced from code ranging information (i.e., code attribute) transmitted by a subscriber station 10 in step 503. At this time, when determining that time, frequency and power adjustment through the ranging code has not completed, the base station 20 sets a status field of the RNG-RSP message into 'continue'. Here, FIG. 19 illustrates parameter information included in the RNG-RSP message at the time of a network re-entry and a handover.

FIG. 19 is a diagram illustrating parameter information included in a Ranging Response (RNG-RSP) message at the time of a network reentry and a handover according to an exemplary embodiment of the present invention.

Referring back to FIG. 16, when the RNG-RSP message is received, the subscriber station 10 confirms code ranging information and adjusts time, frequency and power offset, wherein when a status field of the RNG-RSP field is 'continue', the subscriber station 10 retransmits the initial ranging code in step 505. Thereafter, the base station 20 performs a correction action of time, frequency, and transmission power of a ranging code transmitted by the subscriber station 10, and when determined that the time, frequency and power adjustment have been completed, the base station 20 marks a status field of an RNG-RSP message into 'success' and transmits the RNG-RSP message in step 507.

Thereafter, the base station 20 determines uplink resources (i.e., UL bandwidth or UL duration) of a subscriber station considering a handover ranging code received from the subscriber station in step 509, and allocates the determined uplink resources through a UL-MAP having a CDMA_Allocation_IE in step 511. That is, the base station 20 may allocate uplink resources of a same amount as uplink resources allocated in the case of a handover of the subscriber station, even at the time of a network re-entry due to link loss.

Thereafter, the subscriber station 10 transmits an RNG-REQ message using the allocated uplink resources in step 513, and the base station 20 transmits an RNG-RSP message to the subscriber station in step 515. At this time, the RNG_REQ message contains a MAC address or an MS random, thereby enabling the base station 20 to distinguish the RNG-REQ message transmitted subscriber station 10 from several stations.

Thereafter, the subscriber station 10 transmits a SBC-REQ message to the base station 20 in step 517, and the following steps are performed similarly to the related art.

Figure 17:
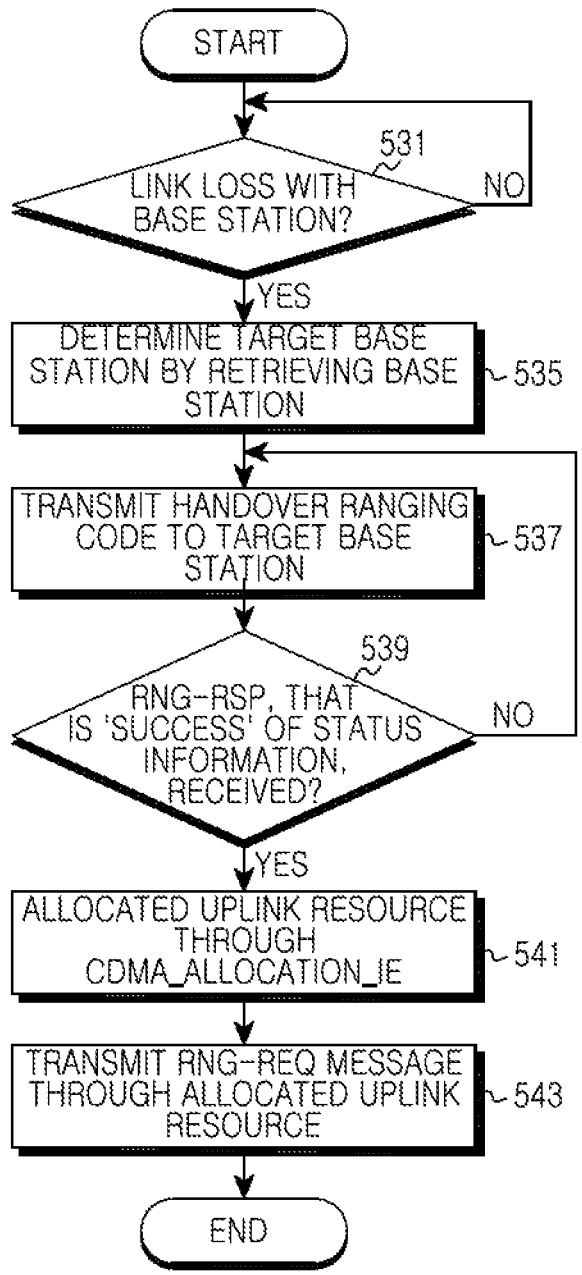
FIG. 17 illustrates a ranging procedure of a subscriber station in a communication system according to an exemplary embodiment of the present invention.

FIG. 17 illustrates a ranging procedure of a subscriber station in a communication system according to an exemplary embodiment of the invention.

Referring to the FIG. 17, the subscriber station 10 determines if a link loss with a base station 20 occurred in step 531. When link loss with a base station 20 has occurred, a subscriber station 10 retrieves a base station for network re-entry and determines a target base station in step 535. The base station 20 also determines a handover ranging code into an initial ranging code and transmits it to the target base station 20 in step 537.

Thereafter, the subscriber station 10 determines if an RNG-RSP message, that is status information indicative of 'success', has been received in step 539, and returns to the step 537 when the RNG-RSP message is not received to retransmit the initial ranging code to the base station 20.

On the other hand, when the RNG-RSP message, that is 'success' of the status information, has been received, the subscriber station 10 proceeds to step 541 to allocate uplink resources through a CDMA_Allocation_IE from the base station and transmits an RNG-REQ message through the allocated uplink resources in step 543. Thereafter, the procedure ends.

Figure 18:
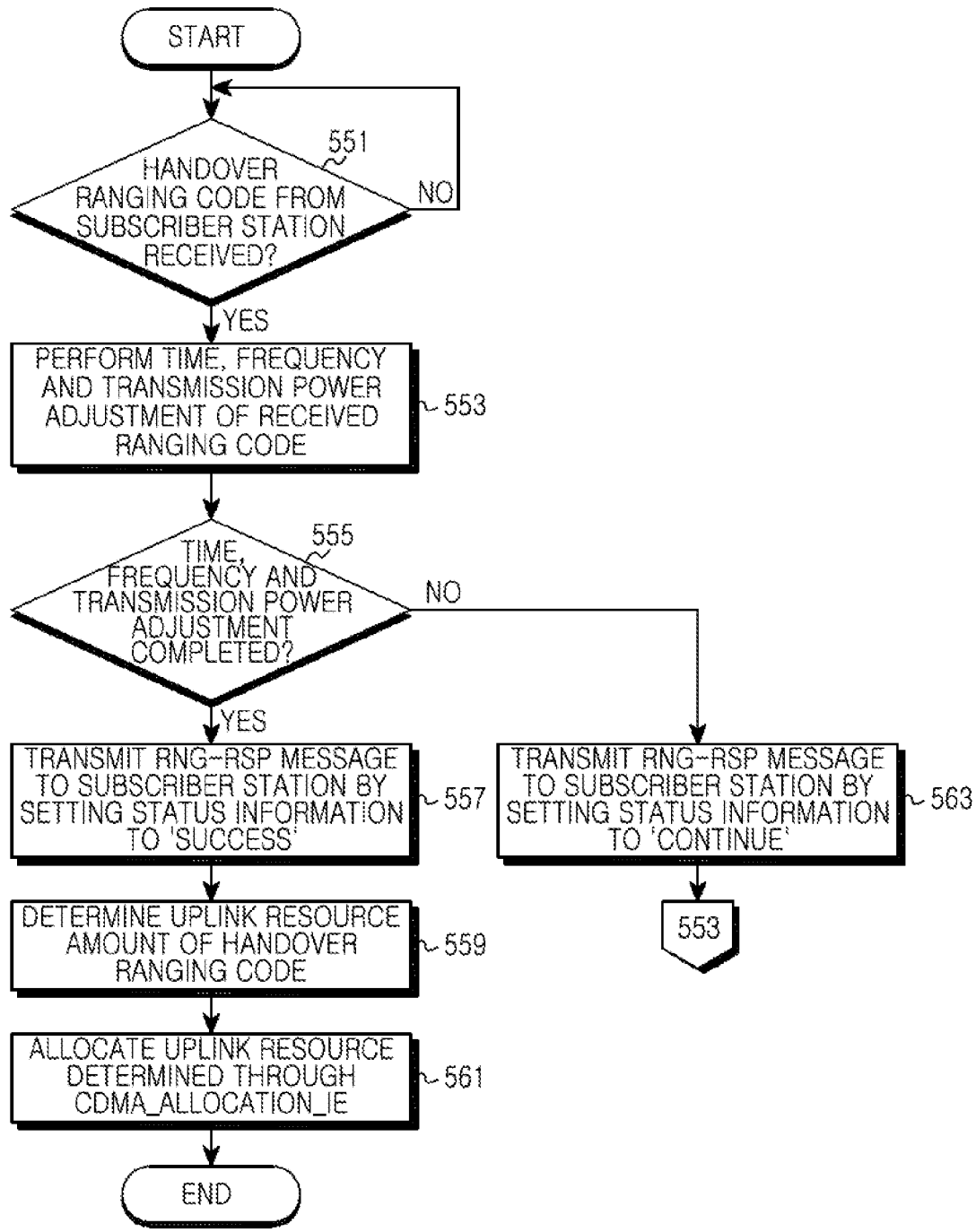
FIG. 18 illustrates a ranging procedure of a base station in a communication system according to an exemplary embodiment of the present invention.

FIG. 18 illustrates a ranging procedure of a base station in a communication system according to an exemplary embodiment of the invention.

Referring to the FIG. 18, the base station 20 determines if a handover ranging code as an initial ranging code from a subscriber station 10 has been received in step 551. When the handover ranging code is received, the base station 20 performs a correction action of time, frequency and transmission power of the received ranging code in step 553, and determines if the time, frequency and transmission power adjustment have been completed in step 555. Here, when determined that the time, frequency and transmission power control have not been completed, the base station 20 sets a status field of the RNG-RSP message to 'continue' to transmit it to the station 10 in step 563, and returns to the step 553.

On the other hand, if it is determined that the time, frequency and power adjustment have been completed, the base station 20 marks a status field of an RNG-RSP message into 'success' to transmit it to the subscriber station 10 in step 557. Thereafter, the base station 20 determines an amount of uplink resources (i.e., UL bandwidth or UL duration) of the subscriber station considering the handover ranging code in step 559 and allocates the determined uplink resources through a CDMA_Allocation_IE in step 561. Thereafter, the base station 20 ends the procedure.

Fourth, when uplink resources allocated to a subscriber station from a base station are smaller than the size of an RNG-REQ message to be transmitted, the subscriber terminal fragmentizes the RNG-REQ message and requests uplink resources needed for the fragmented RNG-REQ, thereby additionally allocating uplink resources in a repeated way from the base station. That is, the subscriber terminal fragmentizes the RNG-REQ message into plural pieces, contains a parameter indicating size of a bandwidth needed by a next RNG-REQ message into a fragmented RNG-REQ message, and transmits it to the base station through the allocated uplink resources, so that the subscriber station 10 is additionally allocated uplink resources in a repeated way from the base station and transmits fragmented plural RNG-REQ messages. Herein, the base station and a subscriber station identify a corresponding station using an RAID, and confirm resources allocated to its own. The RAID is produced from ranging code information transmitted according to a ranging procedure by the subscriber station, generated in consideration of a superframe number, a frame index, a ranging code index and a ranging opportunity index. For example, the RAID may be determined by equation 1 below. At this time, an allocated bit size may be differently defined according to conditions.

$$RAID = (\text{superframe number LSB4 bits}|\text{frame index 2 bits}|\text{ranging code index 6 bits}|\text{ranging opportunity index 2 bits}). \quad (1)$$

A procedure of fragmentizing an RNG-REQ message by the subscriber station and repeatedly allocating uplink resources for fragmented RNG-REQ will be described below with reference to FIGS. 20 through 22.

Figure 20:
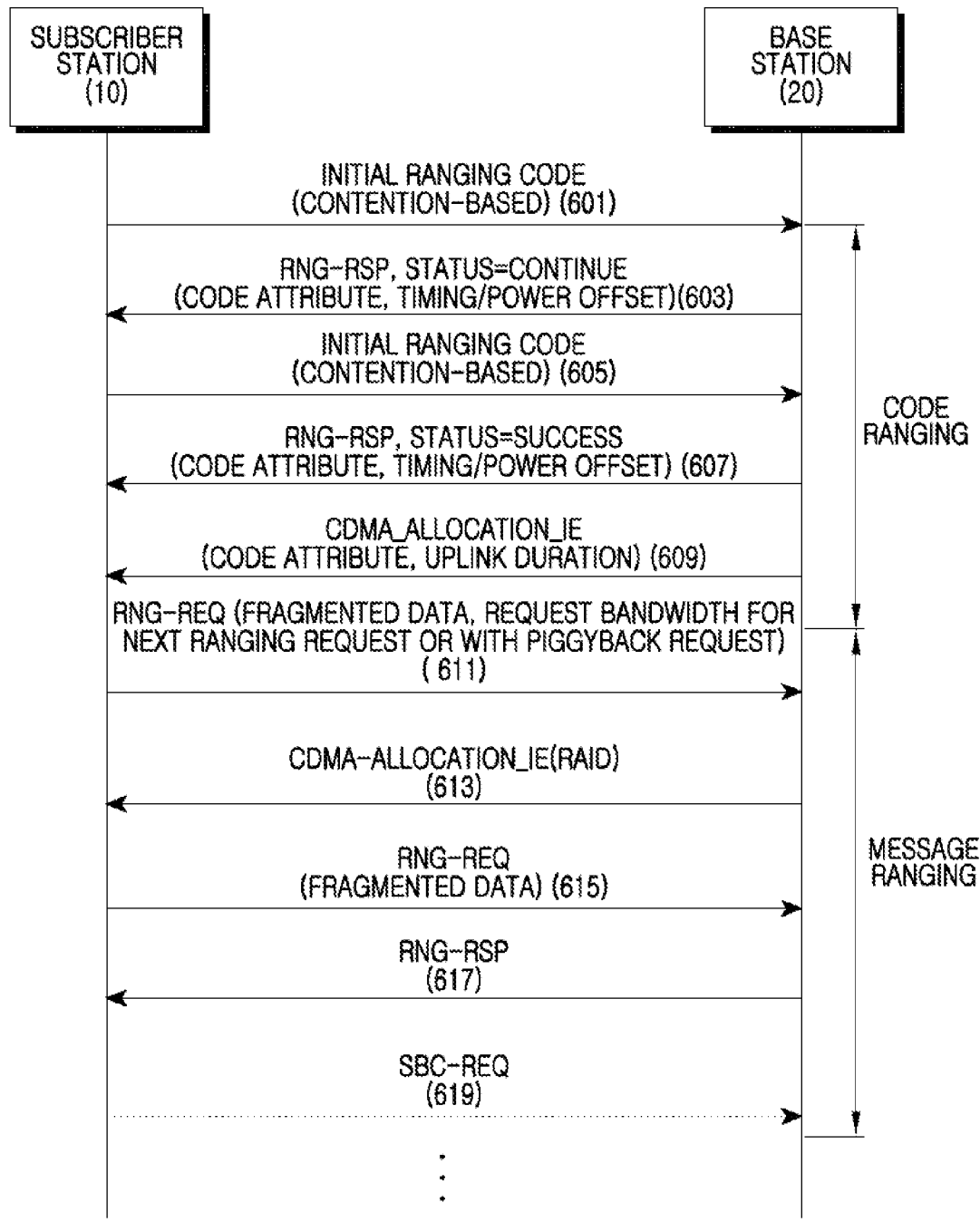
FIG. 20 illustrates a ranging procedure of a communication system according to an exemplary embodiment of the present invention.

FIG. 20 illustrates a ranging procedure of a communication system according to an exemplary embodiment of the invention. Hereinafter, since steps 601 through 607 of FIG. 20 are the same as steps 301 through 307 of FIG. 5, a description thereof will be omitted.

Referring to the FIG. 20, the base station 20 allocates uplink resources (i.e., UL bandwidth or UL duration) for an RNG-REQ message transmission of the subscriber station 10 through a CDMA_Allocation_IE in consideration of an RAID in step 609.

When the size of uplink resources allocated from the base station 20 is smaller than the size of a transmitted RNG-REQ message, the subscriber station 10 fragmentizes the RNG-REQ message and generates plural fragmented RNG-REQ messages, and transmits it by including a BW-REQ header or a PBREH requesting a bandwidth allocation for transmission of other fragmented RNG-REQ message when a fragmented first RNG-REQ message is transmitted in step 611. Here, the bandwidth request header or PBREH does not contain a Station ID (STID). Herein, the subscriber station 10 may request a bandwidth allocation corresponding to a fragmented one RNG-REQ message size, and may request a bandwidth allocation corresponding to the size of fragmented remaining RNG-REQ messages.

Thereafter, the base station 20 additionally allocates an uplink bandwidth to the subscriber station 10 through the CDMA_Allocation_IE in step 613. At this time, the base station 20 transmits the CDMA_Allocation_IE to the subscriber station 10 by considering an RAID referenced at the time of the first uplink resource allocation. Herein, the base station 20 continuously uses the RAID referenced at the time of successfully descrambling a first CDMA_Allocation_IE by the subscriber station 10 in allocating a bandwidth using the CDMA_Allocation_IE while the subscriber station 10 transmits a fragmented RNG-REQ message in the future and requests an additional bandwidth. That is, the RAID references at the time of successfully descrambling a first CDMA_Allocation_IE is the same as the RAID used while the subscriber station 10 transmits an RNG-REQ message in the future and requests an additional bandwidth.

The subscriber station 10 confirms uplink resources additionally allocated to itself using the RAID in step 613 and transmits a fragmented remaining RNG-REQ message to the base station 20 through the uplink resources in step 615. The base station 20 receiving the fragmented remaining RNG-REG message transmits an RNG-RSP message in step 617. As such, by repeatedly performing a process of requesting an additional allocation of uplink resources while transmitting a fragmented RNG-REQ message and transmitting again a fragmented RNG-RNG message through an additionally allocated uplink resources, a fragmented RNG-REQ message is transmitted, so that the subscriber station 10 and the base station 20 complete the ranging procedure.

Thereafter, the subscriber station 10 transmits a SBC-REQ message to the base station 20 in step 619. The following steps are performed similarly to the related art.

Figure 21:
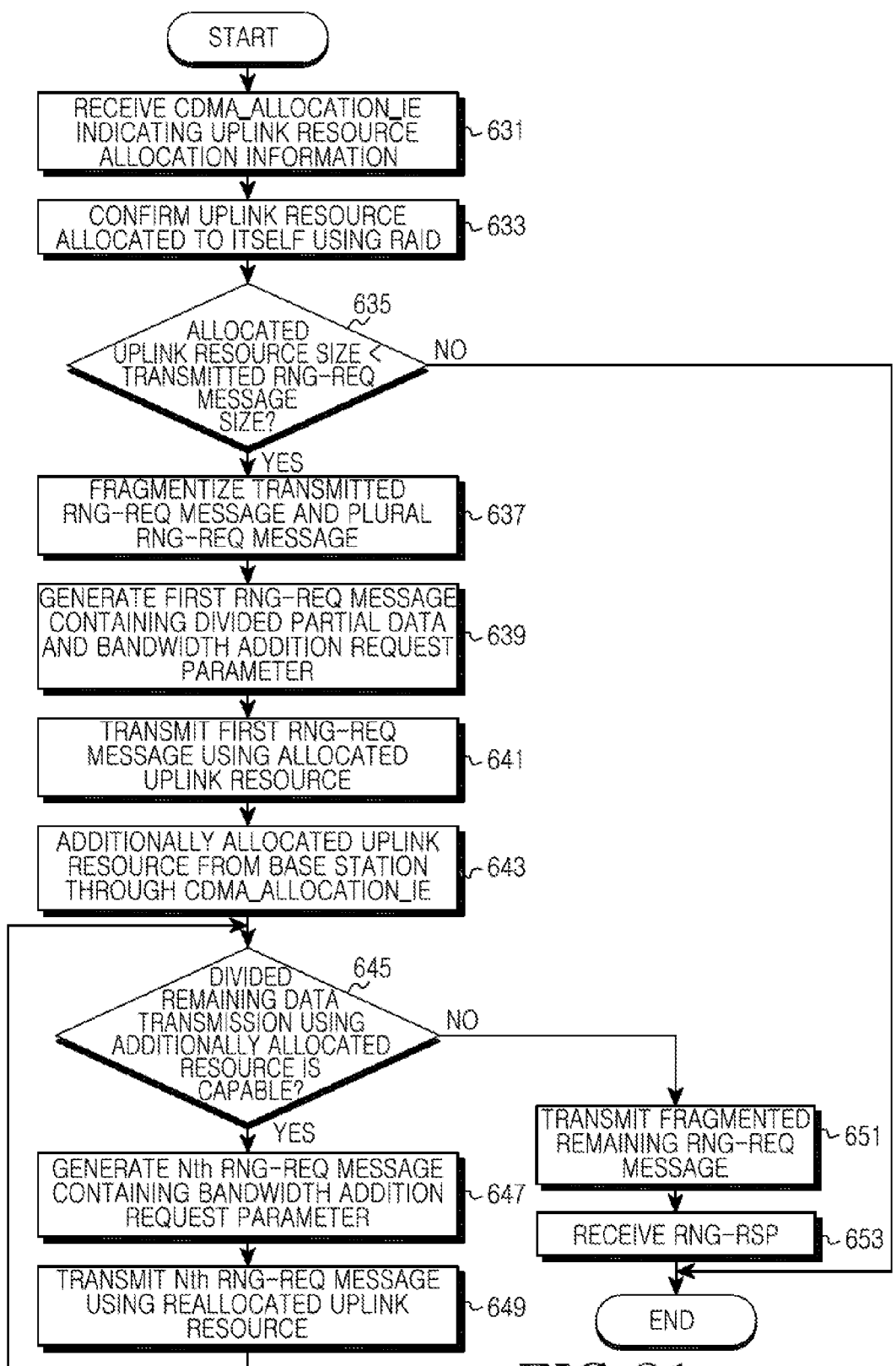
FIG. 21 illustrates a ranging procedure of a subscriber station in a communication system according to an exemplary embodiment of the present invention.

FIG. 21 illustrates a ranging procedure of a subscriber station in a communication system according to an exemplary embodiment of the invention. Herein, a procedure of a subscriber station 10 transmitting a ranging code and a base station allocating uplink resources through a CDMA_Allocation_IE is similar to the related art. Therefore, a description thereof will be omitted.

Referring to the FIG. 21, when the CDMA_Allocation_IE indicating allocation information of uplink resources from a base station is received in step 631, the subscriber station 10 confirms uplink resources allocated to itself using an RAID in step 633. A RAID is generated from ranging code information transmitted according to a ranging procedure by the subscriber station and may be generated, for example, similarly to equation 1.

Thereafter, the subscriber station 10 determines if size of the allocated uplink resources is smaller than the size of a transmitted RNG-REG message in step 635. If the size of the allocated uplink resources is greater or equal to that of a transmitted RNG-REG message, the subscriber station 10 ends the procedure.

On the other hand, when the size of the allocated uplink resources is smaller than the size of a transmitted RNG-REG message, the subscriber station 10 fragmentizes the transmitted RNG-REQ message and generates a plural fragmented RNG-REQ message in step 637. Thereafter, the subscriber station 10 contains a bandwidth request header or a PBREH requesting a bandwidth allocation for transmission of another fragmented RNG-REQ message into a fragmented first RNG-REQ message in step 639, and transmits the first RNG-REQ message using the allocated uplink resources in step 641.

The subscriber station 10 is additionally allocated an uplink bandwidth from a base station through a CDMA_Allocation_IE in step 643.

Thereafter, the subscriber station 10 determines if transmission of fragmented remaining RNG-REQ messages is capable using the additionally allocated resources in step 645. If transmission of the remaining RNG-REQ messages is incapable, the subscriber station generates an nth RNG-REQ message requesting a bandwidth allocation for transmission of other fragmented RNG-REQ messages in step 647 and transmits the nth RNG-REQ message using the additionally allocated resources in step 649. Thereafter, the subscriber station returns back to step 643 and re-performs the following steps.

On the other hand, when transmission of the other RNG-REQ messages is capable, the subscriber station transmits fragmented remaining RNG-REQ messages using the additionally allocated resources in step 651, and receives an RNG-RSP message from a base station in step 653. Thereafter, the procedure ends.

Figure 22:
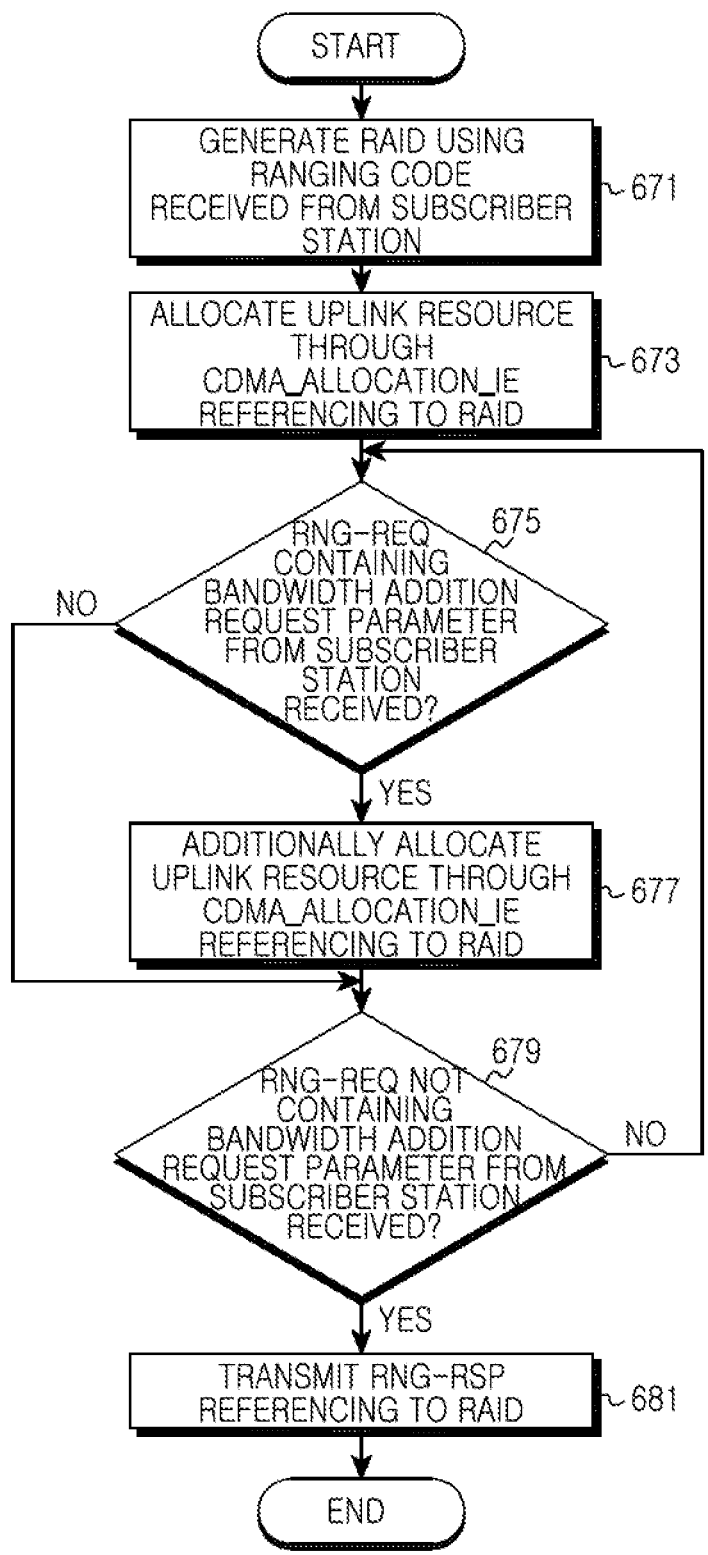
FIG. 22 illustrates a ranging procedure of a base station in a communication system according to an exemplary embodiment of the present invention.

FIG. 22 illustrates a ranging procedure of a base station in a communication system according to an exemplary embodiment of the invention.

Herein, since a procedure of a base station 20 receiving a ranging code from a station 10 and allocating uplink resources through a CDMA_Allocation_IE is similar to the related art, a related description thereof will be omitted.

Referring to the FIG. 22, the base station 20 generates an RAID using a ranging code received from a subscribed station in step 671. Herein, the RAID may be generated referencing a superframe number, a frame index, a ranging code index, a ranging opportunity index, and may be generated using, for example, equation 1.

Thereafter, the base station 20 allocates uplink resources through a CDMA_Allocation_IE to a corresponding station 10 referencing to the RAID, and determines if an RNG-REQ message containing a bandwidth addition request parameter from the station 10 is received through the allocated uplink resources in step 673. That is, the base station 20 determines if an RNG-REQ message including a bandwidth request header or PBREH is received in step 675. If it is determined that the RNG-REQ message including the bandwidth addition request header or PBREH is not received, the base station 20 proceeds to step 679.

On the other hand, if it is determined that the RNG-REQ message containing the bandwidth addition request header or PBREH is received, the base station 20 transmits an RNG-REQ to the subscriber station referencing to the generated RAID, and additionally allocates an uplink bandwidth through a CDMA_Allocation_IE in step 677.

Thereafter, the base station 20 determines if an RNG-REQ message not containing a bandwidth addition request parameter from the station 10 is received in step 679. If it is determined that the RNG-REQ message not containing a bandwidth addition request parameter is not received, the base station 20 returns to the step 675 to re-perform the following steps. If it is determine that the RNG-REQ message not containing a bandwidth addition request parameter is received, the base station transmits an RNG-RSP to the station 10 referencing to the RAID in step 681 and the procedure ends.

Fifth, when uplink resources allocated to a subscriber station from a base station are smaller than the size of an RNG-REQ message to be transmitted, the subscriber station fragmentizes the RNG-REQ message in the same way as a fourth method and requests uplink resources needed for a fragmented RNG-REQ, thereby additionally allocating in a repeated way uplink resources from the base station. However, unlike the fourth method, a superframe number is included in the CDMA_Allocation_IE to identify the station.

Herein, the RAID is produced in consideration of the superframe number, a frame index, a ranging code index, a ranging opportunity index, and the RAID may be obtained similar to, for example, Equation 1. Herein, an allocated bit size may be differently defined according to conditions.

Also, the fifth method includes the superframe number in the CDMA_Allocation_IE, in order to prevent a mixing of RAIDs used between subscriber stations resulting from a lengthening transmission time of an RNG-REQ due to fragmented RNG-REQ and Hybrid Automatic Repeat Request (HARQ) retransmission at the time of an uplink resource allocation using the CDMA allocation_IE. That is, it is enabled that each subscriber station may confirm uplink resources allocated to its own using the superframe number and RAID contained in the CDMA_Allocation_IE.

Figure 23:
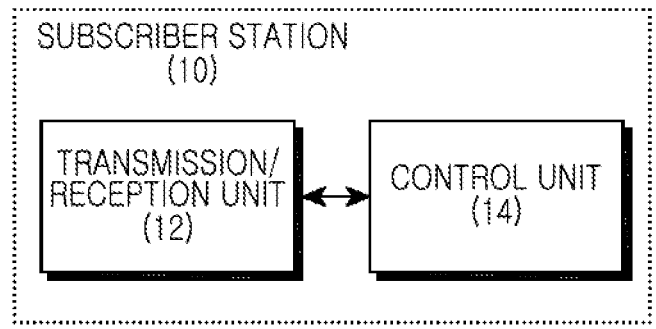
FIG. 23 illustrates a block construction of a subscriber station in a communication system according to an exemplary embodiment of the invention.

FIG. 23 illustrates a block configuration of a subscriber station in a communication system according to an exemplary embodiment of the invention.

Referring to FIG. 23, the subscriber station 10 is constructed to include a transmission/reception unit 12 and a control unit 14.

The transmission/reception unit 12 functions to process signals transmitted/received to and from a base station according to control of the control unit 14.

The control unit 14 controls and processes a general operation of the subscriber station 10, and controls and processes a function of allocating a bandwidth for a ranging request message from a base station according to an exemplary embodiment of the present invention. That is, the control unit 14 controls and processes for allocating a bandwidth needed in transmission of a ranging request message from the base station according to the above five methods.

Figure 24:
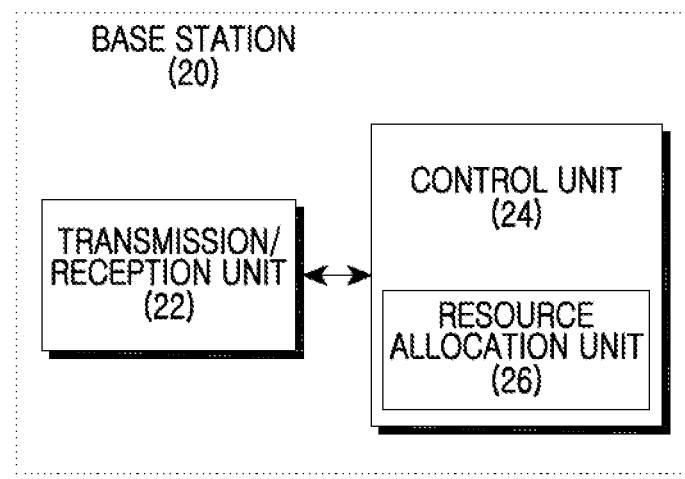
FIG. 24 illustrates a block construction of a base station in a communication system according to an exemplary embodiment of the present invention.

FIG. 24 illustrates a block construction of a base station in a communication system according to an exemplary embodiment of the present invention.

Referring to FIG. 24, the base station 20 is constructed to include a transmission/reception unit 22 and a control unit 24, and the control unit 26 includes a resource allocation unit 26.

The transmission/reception unit 22 functions to process signals transmitted/received to and from a base station according to control of the control unit 14.

The control unit 24 controls and processes a general operation of the base station 20. More particularly, the control unit 24 includes a resource allocation unit 26, thereby controlling and processing functions in allocating a bandwidth to transmit a ranging request message of each subscriber station. The control unit 24 controls and processes for allocating a bandwidth needed in transmission of a ranging request message of a subscriber station according to the above described five methods.

The exemplary embodiments of the present invention request allocation of uplink resources from a base station using a ranging request message containing a bandwidth request header or a bandwidth request extended header (i.e., PBREH) by a subscriber station when allocated uplink resources are smaller than the size of a transmitted ranging request message when the station enters a network in a communication system. Accordingly, time extending a network entry and re-entry procedure is decreased and an unnecessary action of a subscriber station is reduced.

While the invention has been shown described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for requesting uplink resources to transmit a ranging request message by a terminal in a mobile communication system, the method comprising:
receiving a first message comprising information of a first uplink bandwidth allocated for the terminal from a base station;
fragmentizing a ranging request (RNG-REQ) message into plural fragmented RNG-REQ messages based on the allocated first uplink bandwidth, if the allocated first uplink bandwidth does not accommodate an entire RNG-REQ message;
requesting an additional uplink bandwidth through one of a bandwidth request without station id (STID) header and a piggybacked bandwidth request extended header (PBREH); and
receiving a second message comprising information of an additional uplink (UL) bandwidth allocated from the terminal, from the base station,
wherein the additional uplink bandwidth is allocated based on a random access identifier used for the first uplink bandwidth allocation, and
wherein the random access identifier is determined by concatenating least significant bit (LSB) n-bits of a superframe number, a frame index, a ranging code index, and a ranging opportunity index.

2. The method of claim 1, wherein the additional uplink bandwidth comprises a size of at least one of the one fragmented RNG-REQ message and fragmented remaining RNG-REQ messages.

3. The method of claim 1, wherein the fragmentizing of the RNG-REQ message into the plural fragmented RNG-REQ messages comprises fragmentizing such that at least the one fragmented RNG-REQ message becomes a size capable of being transmitted through the allocated first uplink bandwidth.

4. The method of claim 1,
wherein the superframe number is a superframe number of transmission time of a ranging code.

5. The method of claim 1, wherein the bandwidth request without STID header comprises a bandwidth request size, a bandwidth request type indicating whether the requested bandwidth is incremental or aggregate, and a flow identifier for which bandwidth is requested, and
wherein the PBREH comprises a flow identifier, a request type indicating whether the requested bandwidth is incremental or aggregate, and an amount of bandwidth requested.

6. An apparatus for requesting uplink resources to transmit a ranging request message by a terminal in a mobile communication system, the apparatus comprising:
a transmission/reception unit configured to process a message transceived with a base station; and
a control unit for controlling to receive a first message comprising information of a first uplink bandwidth allocated for the terminal, from a base station for fragmentizing a ranging request (RNG-REQ) message into plural fragmented RNG-REQ messages based on an allocated first uplink bandwidth if the first uplink bandwidth does not accommodate an entire RNG-REQ message, for requesting an additional uplink bandwidth through one of a bandwidth request without station id (STID) header and a piggybacked bandwidth request extended header (PBREH), and for controlling to receive a second message comprising information of an additional uplink bandwidth allocated for the terminal from the base station,
wherein the additional uplink bandwidth is allocated based on a random access identifier used for the first uplink bandwidth allocation, and
wherein the random access identifier is determined by concatenating least significant bit (LSB) n-bits of a superframe number, a frame index, a ranging code index, and a ranging opportunity index.

7. The apparatus of claim 6, wherein the additional uplink bandwidth comprises a size of at least one of the one fragmented RNG-REQ message and fragmented remaining RNG-REQ messages.

8. The apparatus of claim 6, wherein the control unit fragmentizes the RNG-REQ message such that at least the one fragmented RNG-REQ message becomes a size capable of being transmitted through the allocated first uplink bandwidth.

9. The apparatus of claim 6,
wherein the superframe number is a superframe number of transmission time of a ranging code.

10. The apparatus of claim 6, wherein the bandwidth request without STID header comprises a bandwidth request size, a bandwidth request type indicating whether the requested bandwidth is incremental or aggregate, and a flow identifier for which bandwidth is requested, and
wherein the PBREH comprises a flow identifier, a request type indicating whether the requested bandwidth is incremental or aggregate, and an amount of bandwidth requested.

11. A method for allocating uplink resources to transmit a ranging request message by a base station in a mobile communication system, the method comprising:
transmitting to a terminal a first message comprising information of a first uplink bandwidth allocated for the terminal;
receiving an additional uplink bandwidth request message that requests an additional allocation of an uplink bandwidth through one of bandwidth request without station id (STID) header and a piggybacked bandwidth request extended header (PBREH); and
transmitting to the terminal, a second message comprising information of an additional uplink bandwidth allocated for the terminal,
wherein the additional uplink bandwidth is allocated based on a random access identifier used for the first uplink bandwidth allocation, and
wherein the random access identifier is determined by concatenating least significant bit (LSB) n-bits of a superframe number, a frame index, a ranging code index, and a ranging opportunity index.

12. The method of claim 11,
wherein the superframe number is a superframe number of transmission time of a ranging code.

13. The method of claim 11, wherein the bandwidth request without STID header comprises a bandwidth request size, a bandwidth request type indicating whether the requested bandwidth is incremental or aggregate, and a flow identifier for which bandwidth is requested, and
wherein the PBREH comprises a flow identifier, a request type indicating whether the requested bandwidth is incremental or aggregate, and an amount of bandwidth requested.

14. An apparatus for allocating uplink resources to transmit a ranging request message by a base station in a mobile communication system, the apparatus comprising:
a transmission/reception unit configured to process a message transceived with a terminal; and
a control unit for controlling to transmit a first message comprising information of a first uplink bandwidth allocated for a terminal to the terminal, for receiving an additional uplink request message that requests an additional allocation of an uplink bandwidth through one of bandwidth request without station id (STID) header and a piggybacked bandwidth request extended header (PBREH), and for controlling to transmit requested second message comprising information of an additional uplink bandwidth for the terminal to the terminal,
wherein the additional uplink bandwidth is allocated based on a random access identifier used for the first uplink bandwidth allocation, and
wherein the random access identifier is determined by concatenating least significant bit (LSB) n-bits of a superframe number, a frame index, a ranging code index, and a ranging opportunity index.

15. The apparatus of claim 14,
wherein the superframe number is a superframe number of transmission time of a ranging code.

16. The apparatus of claim 14, wherein the bandwidth request without STID header comprises a bandwidth request size, a bandwidth request type indicating whether the requested bandwidth is incremental or aggregate, and a flow identifier for which bandwidth is requested, and
wherein the PBREH comprises a flow identifier, a request type indicating whether the requested bandwidth is incremental or aggregate, and an amount of bandwidth requested.

* * * * *